US011515994B2

(12) United States Patent
Sinclair et al.

(10) Patent No.: US 11,515,994 B2
(45) Date of Patent: Nov. 29, 2022

(54) SYNCHRONIZER AND SYNCHRONIZING TRANSFER OVER AN OPTICAL LINK

(71) Applicant: Government of the United States of America, as represented by the Secretary of Commerce, Gaithersburg, MD (US)

(72) Inventors: Laura Cathleen Sinclair, Boulder, CO (US); Nathan Reynolds Newbury, Boulder, CO (US); William Charles Swann, Boulder, CO (US); Jean-Daniel Deschenes, Quebec (CA)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 4 days.

(21) Appl. No.: 17/209,285

(22) Filed: Mar. 23, 2021

(65) Prior Publication Data

US 2022/0026192 A1 Jan. 27, 2022

Related U.S. Application Data

(60) Provisional application No. 63/054,993, filed on Jul. 22, 2020.

(51) Int. Cl.
H04B 10/00 (2013.01)
H04L 7/00 (2006.01)

(52) U.S. Cl.
CPC .................. H04L 7/0008 (2013.01)

(58) Field of Classification Search
CPC ................ H04L 7/0008; H04L 7/0075; H04B 10/0775; H04B 10/112
USPC .................................. 375/354, 356; 398/154
See application file for complete search history.

(56) References Cited

U.S. PATENT DOCUMENTS

| 9,557,625 | B2 | 1/2017 | Coddington et al. | |
|---|---|---|---|---|
| 10,389,514 | B2 | 8/2019 | Sinclair et al. | |
| 2006/0120733 | A1* | 6/2006 | Tucker | H04B 10/60 398/204 |
| 2012/0154062 | A1* | 6/2012 | Wilkinson | G04F 13/02 331/94.1 |
| 2018/0294946 | A1* | 10/2018 | Sinclair | H04B 10/61 |
| 2021/0099230 | A1* | 4/2021 | Nishioka | H04B 10/2575 |

OTHER PUBLICATIONS

Deschenes, J-D., et al., "Synchronization of Distant Optical Clocks at the Femtosecond Level", Physical Review X, 2016, p. 021016, vol. 6.
Sinclair, L., et al., "Optical system design for femtosecondlevel synchronization of clocks" SPIE, 2016.
Giorgetta, F.R., et al.,"Optical two-way time and frequency transfer over free-space", Nature Photonics, 2013, p. 434-438, vol. 7.

* cited by examiner

Primary Examiner — Don N Vo
(74) Attorney, Agent, or Firm — Office of Chief Counsel for National Institute of Standards and Technology

(57) ABSTRACT

A synchronizer for synchronizing transfer over an optical link includes a frequency reference oscillator; a tracking optical timing source; a tracking comb signal; a signal processor-controller; a comb timing discriminator; a clock frequency comb; a bidirectional terminal; a time-frequency offset measurement system; and a second comb timing discriminator.

20 Claims, 13 Drawing Sheets

SYNCHRONIZER AND SYNCHRONIZING TRANSFER OVER AN OPTICAL LINK

CROSS REFERENCE TO RELATED APPLICATIONS

The application claims priority to U.S. Provisional Patent Application Ser. No. 63/054,993, filed Jul. 22, 2020, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce and under Agreement Nos. HR0011832582 and HR001118P002 awarded by DARPA; Agreement No. F2KBAA9030G103 awarded by Air Force Research Laboratories; and under contract number 1333ND19PNB680111 awarded by NIST. The Government has certain rights in the invention. Licensing inquiries may be directed to the Technology Partnerships Office, NIST, Gaithersburg, Md., 20899; voice 301-975-2573; email tpo@nist.gov; reference NIST Docket Number 20-033US1.

BRIEF DESCRIPTION

Disclosed is a synchronizer for synchronizing transfer over an optical link, the synchronizer comprising: a frequency reference oscillator that produces a frequency reference signal; a tracking optical timing source in communication with the frequency reference oscillator and comprises a tracking frequency comb and that: receives, by the tracking frequency comb, the frequency reference signal from the frequency reference oscillator; produces, by the tracking frequency comb, a tracking comb signal; receives, tracking comb feedback from a signal processor-controller; produces a tracking optical timing signal based on the tracking comb feedback; a comb timing discriminator in communication with the tracking optical timing source and a clock frequency comb and that: receives the tracking comb signal from the tracking optical timing source; receives a clock comb signal from the clock frequency comb; and produces an initial clock comb-tracking comb time offset from the clock comb signal and the tracking comb signal; the clock frequency comb in communication with the clock frequency comb, the frequency reference oscillator, and a bidirectional terminal and that: receives the frequency reference signal from the frequency reference oscillator; produces the clock comb signal based on the frequency reference signal; produces a clock output based on the frequency reference signal; and communicates the clock comb signal to the comb timing discriminator and a bidirectional terminal; the signal processor-controller in communication with the tracking optical timing source, a time-frequency offset measurement system, and the comb timing discriminator and that: receives the initial clock comb-tracking comb time offset from the comb timing discriminator; receives a time-frequency offset signals from the time-frequency offset measurement system; produces, based on the initial clock comb-tracking comb time offset and the time-frequency offset signals, the tracking comb feedback and local one-way data; the time-frequency offset measurement system in communication with the tracking optical timing source, the bidirectional terminal, and the signal processor-controller; comprises a second comb timing discriminator.2; and that: receives the tracking optical timing signal from the tracking optical timing source; receives an incoming optical timing signals from the bidirectional terminal; produces the time-frequency offset signals from the tracking optical timing signal and the incoming optical timing signals; and communicates the time-frequency offset signals to the signal processor-controller; and the bidirectional terminal in communication with the clock frequency comb and the time-frequency offset measurement system and that: receives the clock comb signal from the clock frequency comb; receives synchronization data from an optical link, the synchronization data comprising incoming optical timing signals; communicates the incoming optical timing signals to time-frequency offset measurement system from the optical link; and communicates the clock comb signal to the optical link from the clock frequency comb as part of the synchronization data.

Disclosed is a process for synchronizing transfer over an optical link with the synchronizer, the process comprising: producing, by the frequency reference oscillator, the frequency reference signal; receiving, by the tracking frequency comb, the frequency reference signal from the frequency reference oscillator; producing, by the tracking frequency comb, a tracking comb signal; receiving, by the tracking optical timing source, the tracking comb feedback from the signal processor-controller; producing, by the tracking optical timing source, the tracking optical timing signal based on the tracking comb feedback; receiving, by the comb timing discriminator, the tracking comb signal from the tracking optical timing source; receiving by the comb timing discriminator, the clock comb signal from the clock frequency comb; producing, by the comb timing discriminator, the initial clock comb-tracking comb time offset from the clock comb signal and the tracking comb signal; receiving, by the clock frequency comb, the frequency reference signal from the frequency reference oscillator; producing, by the clock frequency comb, the clock comb signal based on the frequency reference signal; producing, by the clock frequency comb, the clock output based on the frequency reference signal; communicating, by the clock frequency comb, the clock comb signal to the comb timing discriminator and the bidirectional terminal; receiving, by the signal processor-controller, the initial clock comb-tracking comb time offset from the comb timing discriminator; receiving, by the signal processor-controller, the time-frequency offset signals from the time-frequency offset measurement system; producing, by the signal processor-controller based on the initial clock comb-tracking comb time offset and the time-frequency offset signals, the tracking comb feedback and local one-way data; receiving, by the time-frequency offset measurement system, the tracking optical timing signal from the tracking optical timing source; receiving, by the time-frequency offset measurement system, the incoming optical timing signals from the bidirectional terminal; producing, by the time-frequency offset measurement system, the time-frequency offset signals from the tracking optical timing signal and the incoming optical timing signals; communicating, by the time-frequency offset measurement system, the time-frequency offset signals to the signal processor-controller; receiving, by the bidirectional terminal, the clock comb signal from the clock frequency comb; receives, by the bidirectional terminal, synchronization data from the optical link, the synchronization data comprising incoming optical timing signals; communicating, by the bidirectional terminal, the incoming optical timing signals to time-frequency offset measurement system from the optical link; and communicating, by the bidirectional terminal, the clock comb signal to the optical link from the clock frequency comb as part of the synchronization data.

BRIEF DESCRIPTION OF THE DRAWINGS

The following description should not be considered limiting in any way. With reference to the accompanying drawings, like elements are numbered alike.

DETAILED DESCRIPTION

Figure 1:
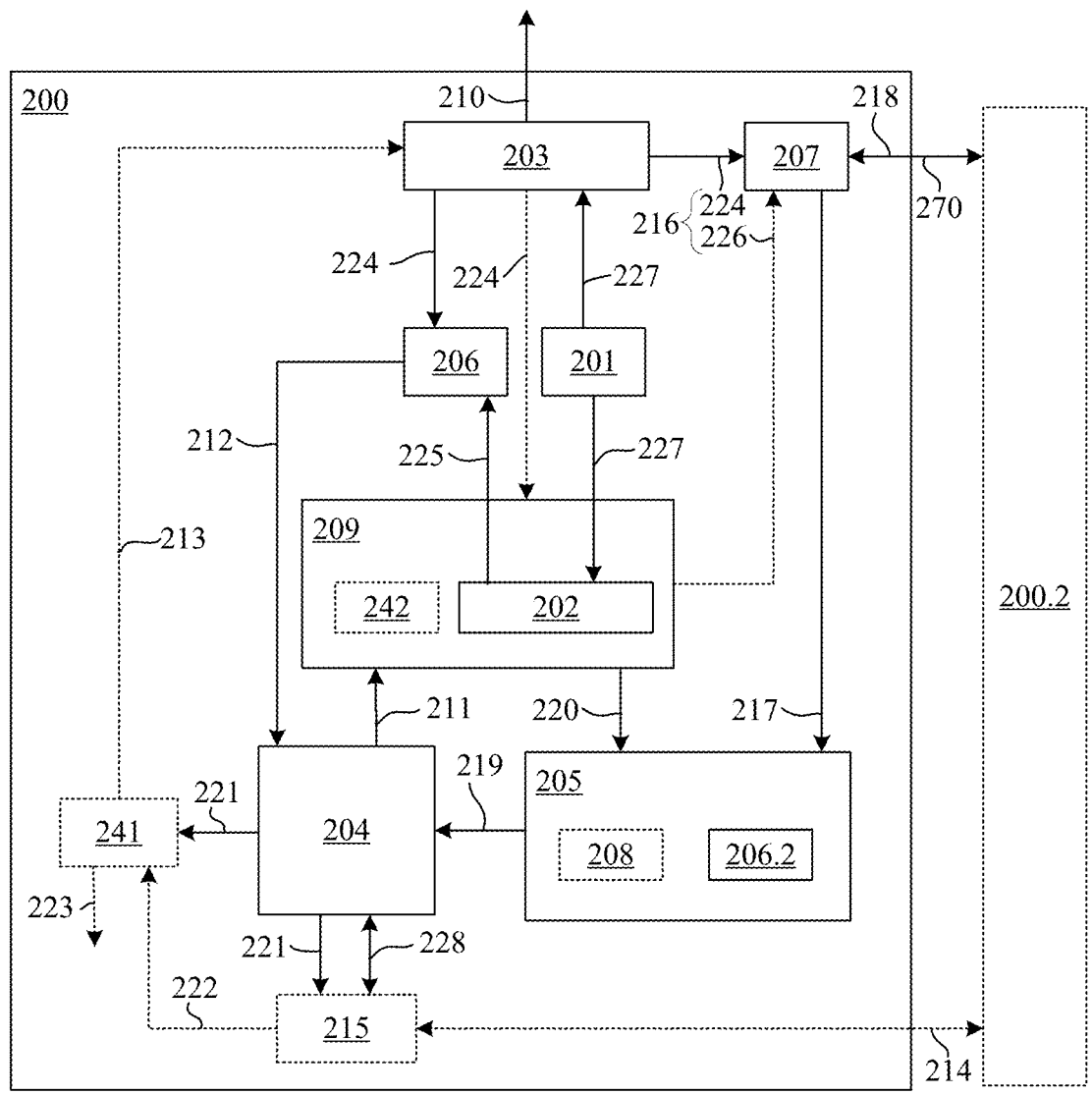
FIG. 1 shows a synchronizer.

A detailed description of one or more embodiments is presented herein by way of exemplification and not limitation.

It has been discovered that a synchronizer with a tracking comb provides photon-efficient agile comb optical clock synchronization for ultra-precise time or frequency transfer over an optical link, e.g., a free-space link, with a distance of communication among the synchronizer and connected devices from kilometers (km) to thousands of kilometers. Frequency-comb-based optical two-way time-frequency transfer provides frequency comparison, time comparison, frequency synchronization or full time synchronization between distance-separated clocks on a sub-femtosecond timescale. The synchronizer provides synchronous operation of a tracking frequency comb with an incoming clock frequency comb signal to retain sub-femtosecond timing and to increase measurement signal-to-noise by over 5000 times and distance of operation from the synchronizer to a connected device by multiple orders of magnitude over previous optically based hardware and optically-based methods. The frequency and timing transfer is accomplished with over 1000 times greater precision than is possible with conventional microwave-based hardware or conventional microwave-based methods.

Synchronizer 200 performs synchronizing transfer over an optical link enabling frequency comparison, time comparison, frequency synchronization, or full time synchronization between sites at each end of the optical link. In an embodiment, with reference to FIG. 1 and FIG. 2, synchronizer 200 includes: frequency reference oscillator 201 that produces frequency reference signal 227; a tracking optical timing source 209 in communication with frequency reference oscillator 201 that includes tracking frequency comb 202 and that: receives, frequency reference signal 227 from frequency reference oscillator 201 to phase lock the tracking frequency comb 202; produces, by tracking frequency comb 202, tracking comb signal 225; receives, tracking comb feedback 211 from signal processor-controller 204; produces tracking optical timing signal 220 from the tracking frequency comb 202; comb timing discriminator 206 in communication with tracking optical timing source 209 and clock frequency comb 203 and that: receives tracking comb signal 225 from tracking frequency comb 202; receives clock comb signal 224 from clock frequency comb 203; and produces clock comb-tracking comb time offset 212 from clock comb signal 224 and tracking comb signal 225; clock frequency comb 203 in communication with frequency reference oscillator 201, and bidirectional terminal 207 and that: receives frequency reference signal 227 from frequency reference oscillator 201; produces clock comb signal 224 based on frequency reference signal 227; produces clock output 210 based on frequency reference signal 227; and communicates clock comb signal 224 to comb timing discriminator 206 and bidirectional terminal 207; signal processor-controller 204 in communication with tracking optical timing source 209, time-frequency offset measurement system 205, and comb timing discriminator 206 and that: receives clock comb-tracking comb time offset 212 from comb timing discriminator 206; receives time-frequency offset signals 219 from time-frequency offset measurement system 205; produces, based on clock comb-tracking comb time offset 212 and time-frequency offset signals 219, tracking comb feedback 211 and local one-way data 221; time-frequency offset measurement system 205 in communication with tracking optical timing source 209, bidirectional terminal 207, and signal processor-controller 204; includes second comb timing discriminator 206.2; and that: receives tracking optical timing signal 220 from tracking optical timing source 209; receives incoming optical timing signals 217 from bidirectional terminal 207; produces time-frequency offset signals 219 from tracking optical timing signal 220 and incoming optical timing signals 217; and communicates time-frequency offset signals 219 to signal processor-controller 204; and bidirectional terminal 207 in communication with clock frequency comb 203 and time-frequency offset measurement system 205 and that: receives clock comb signal 224 from clock frequency comb 203; receives synchronization data 270 from optical link 218, synchronization data 270 including incoming optical timing signals 217; communicates incoming optical timing signals 217 to time-frequency offset measurement system 205 from optical link 218; and communicates clock comb signal 224 to optical link 218 from clock frequency comb 203 as part of synchronization data 270. The synchronization data 270 is the bidirectional data transmitted over the optical link 218 consisting of the outgoing optical timing signals 216 from both Synchronizer 200 and Synchronizer 200.2.

Figure 2:
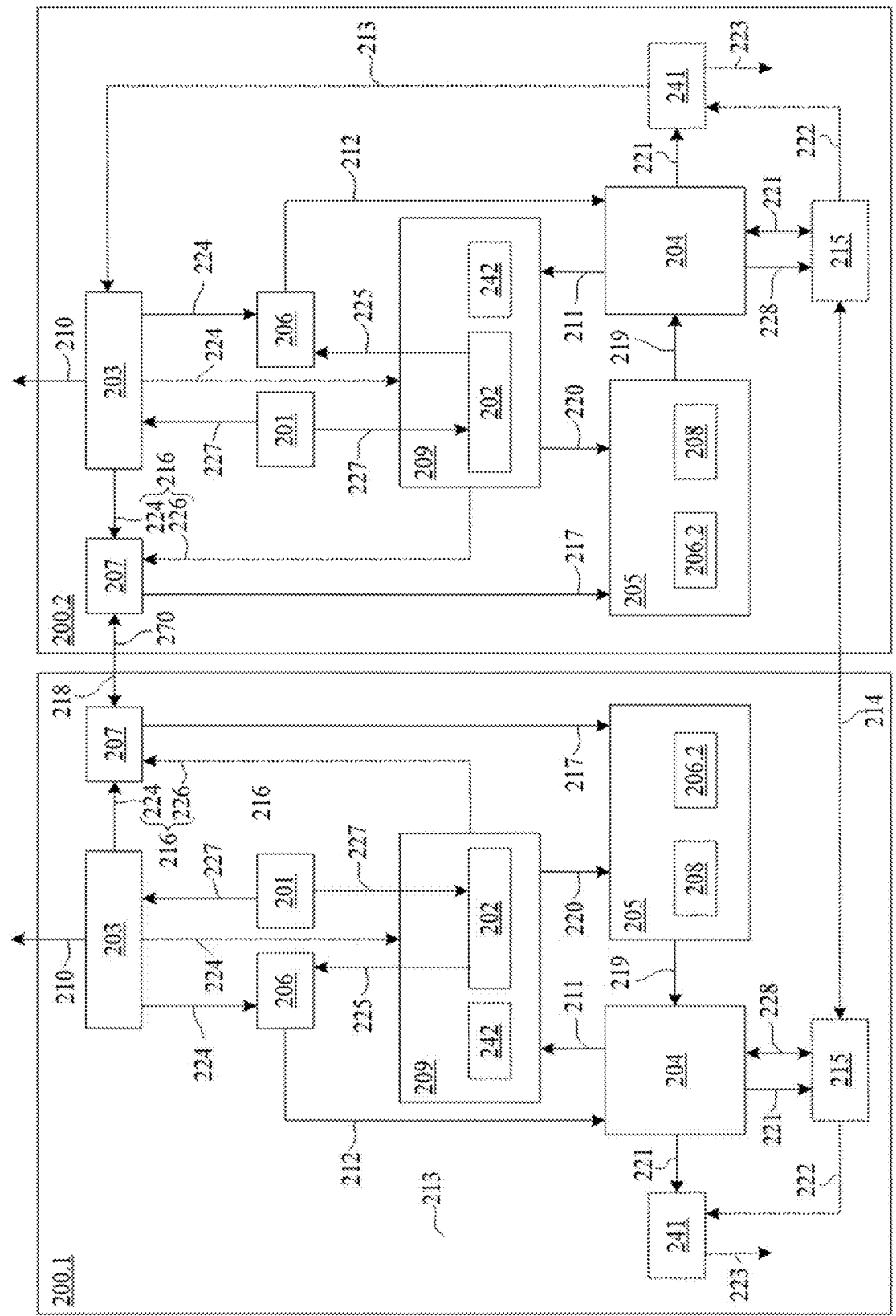
FIG. 2 shows a plurality of synchronizers in communication via an optical link and a communication channel.

In an embodiment, with reference to FIG. 1 and FIG. 2, synchronizer 200 includes a CW laser 242 within tracking optical timing source 209 and tracking frequency comb 202. Tracking optical timing source 209 receives clock comb signal 224 to phase lock the CW laser 242. Tracking optical timing source 209 produces tracking optical timing signal 220 comprised of CW optical signal 226 and tracking comb signal 225. Tracking optical timing source 209 produces CW optical signal 226 for combination with clock comb signal 224 to generate outgoing optical timing signals 216. Time-frequency offset measurement system 205 further includes CW heterodyne detector 208 that measures the heterodyne signal between CW optical signal 226 and the incoming CW optical signal from the opposite site within incoming optical timing signals 217.

In an embodiment, with reference to FIG. 1 and FIG. 2, synchronizer 200 includes communicator 215 in communication with signal processor-controller 204. Communicator 215 receives local one-way data 221 from signal processor-controller 204, communicates side information 228 with signal processor-controller 204; and produces remote one-way data 222 via communication channel 214 with second synchronizer 200.2. Communicator 215 also transmits conventional two-way time transfer protocols via communication channel 214 with second synchronizer 200 to remove time ambiguities associated with outgoing optical timing signals 216 and incoming optical timing signals 217. Communicator 215 can a radio-frequency communication channel or optical communication channel. If it is the optical communication channel, communication channel 214 can be identical to optical link 218 and be transmitted out of bidirectional terminal 207. If it is an optical communication channel, communicator 215 can be implemented by direct amplitude or phase modulation of outgoing optical timing signals 216, clock comb signal 224, or CW optical signal 226.

In an embodiment, with reference to FIG. 1 and FIG. 2, synchronizer 200 includes two-way processor 241 in communication with clock frequency comb 203, signal processor-controller 204, and communicator 215. Two-way processor 241 receives local one-way data 221 from signal processor-controller 204, receives remote one-way data 222 from communicator 215, produces two-way output data 223 and clock comb feedback 213 based on local one-way data 221 and remote one-way data 222, and communicates clock comb feedback 213 to clock frequency comb 203.

Figure 3:
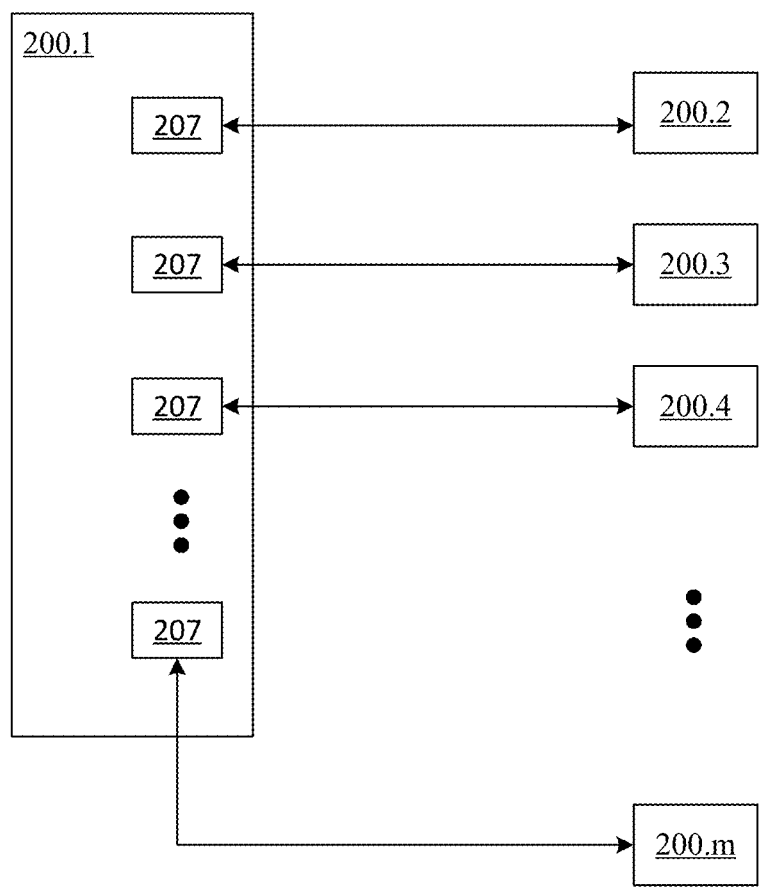
FIG. 3 shows a plurality of synchronizers in communication via an optical link and a communication channel.

In an embodiment, with reference to FIG. 2 and FIG. 3, first synchronizer 200.1 is interconnected and in communication with second synchronizer 200.2 via optical link 218 and communication channel 214. Although, only two synchronizers (200.1, 200.2) are shown in FIG. 2, first synchronizer 200.1 can be connected to an arbitrary number, m, of other synchronizers, wherein m number of synchronizers can be, e.g., single, tens, hundreds, thousands, or millions of other synchronizers as shown in FIG. 3. In the case of a plurality of synchronizers 200 being connected, first synchronizer 200.1 is present and connected to m synchronizers (200.2, 200.3, . . . , 200.m). It should appreciated, as shown in FIG. 2, that clock comb feedback 213 is produced in in synchronizers (200.2, . . . , 200.3) that are connected to first synchronizer 200.1 but absent in first synchronizer 200.1. In this manner, first synchronizer 200.1 operates a lead synchronizer while other synchronizers (200.2, . . . , 200.m) operate as followers to first synchronizer 200.1. It further should be appreciated that among synchronizers (200.1, . . . , 200.m) synchronization data 270 includes outgoing optical timing signals 216 (including clock comb signal 224 and CW optical signal 226) that is sent from one to another synchronizer and incoming optical timing signals 217 that is received from one to another synchronizer. Accordingly, outgoing optical timing signals 216 sent from one synchronizer (e.g., synchronizer 200.1) is received as incoming optical timing signals 217 by another synchronizer (e.g., synchronizer 200.2), and incoming optical timing signals 217 received by one synchronizer (e.g., synchronizer 200.1) is sent as outgoing optical timing signals 216 by another synchronizer (e.g., synchronizer 200.2). It further should be appreciated that, although second synchronizer 200.2 is used to describe a synchronizer 200 that is different that first 200.1, such second synchronizer could be any of or a plurality of arbitrary synchronizers (200.2, 200.3, . . . , 200.m).

Figure 4:
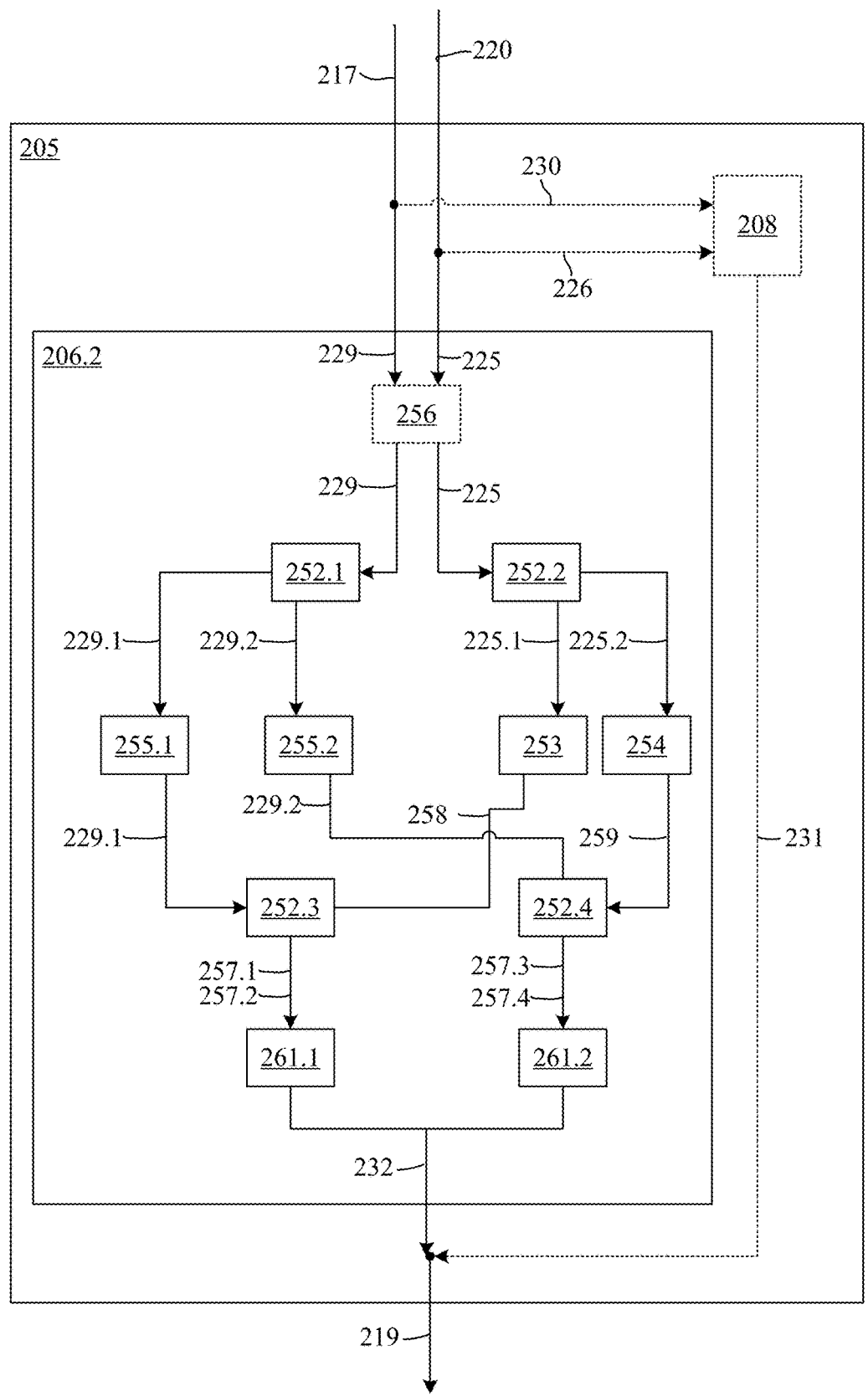
FIG. 4 shows a time-frequency offset measurement system.

In an embodiment, with reference to FIG. 4, second comb timing discriminator 206.2 that includes dispersion compensation unit 256 that receives incoming clock comb signal 229 from incoming optical timing signals 217 and tracking comb signal 225 from tracking optical timing signal 220; and communicates incoming clock comb signal 229 and tracking comb signal 225 each to two separate signal combiner-splitter 252.1 and signal combiner-splitter 252.2. The signal combiner-splitter 252.1 outputs two identical copies of incoming clock comb signal 229.1 and incoming clock comb signal 229.2. The signal combiner-splitter 252.2 outputs two identical copies of tracking comb signal 225.1 and tracking comb signal 225.2. The incoming clock comb signal 229.1 and incoming clock comb signal 229.1 are transmitted to the signal combiner-splitter 252.3 and signal combiner-splitter 252.4 through Fixed delay stage 255.1 and Fixed delay stage 255.2. The tracking comb signal 225.1 is sent to lagging arm delay stage 253 and the tracking comb signal 225.2 is sent to a leading arm delay stage 254. The output of the lagging arm delay stage 253 is the lagging coherent optical pulse trains 258 that is in communication with the signal combiner-splitter 252.3 that received the incoming clock comb signal 229.1 from the Fixed delay stage 255.1. The output of the leading arm delay stage 254 is the leading coherent optical pulse trains 259 that is in communication with the second signal combiner-splitter 252.4 that received the second copy of the incoming clock comb signal 229.2 from the fixed delay stage 255.2. The output of signal combiner-splitter 252.3 and signal combiner-splitter 252.4 are combined coherent optical pulse trains 257 that are in communication with independent photodetector unit 261.1 and photodetector unit 261.2, respectively. The outputs of photodetector unit 261.1 and photodetector unit 261.2 produces time offset signal 232. In addition, time-frequency offset measurement system 205 can include CW heterodyne detector 208. CW heterodyne detector 208 can receive incoming CW optical signal 230 from incoming optical timing signals 217 and CW optical signal 226 from tracking optical timing signal 220 and produces frequency offset signal 231 from incoming CW optical signal 230 and CW optical signal 226. Time-frequency offset measurement system 205 combines time offset signal 232 from second comb timing discriminator 206.2 and frequency offset signal 231 from CW heterodyne detector 208 into time-frequency offset signals 219.

Figure 5:
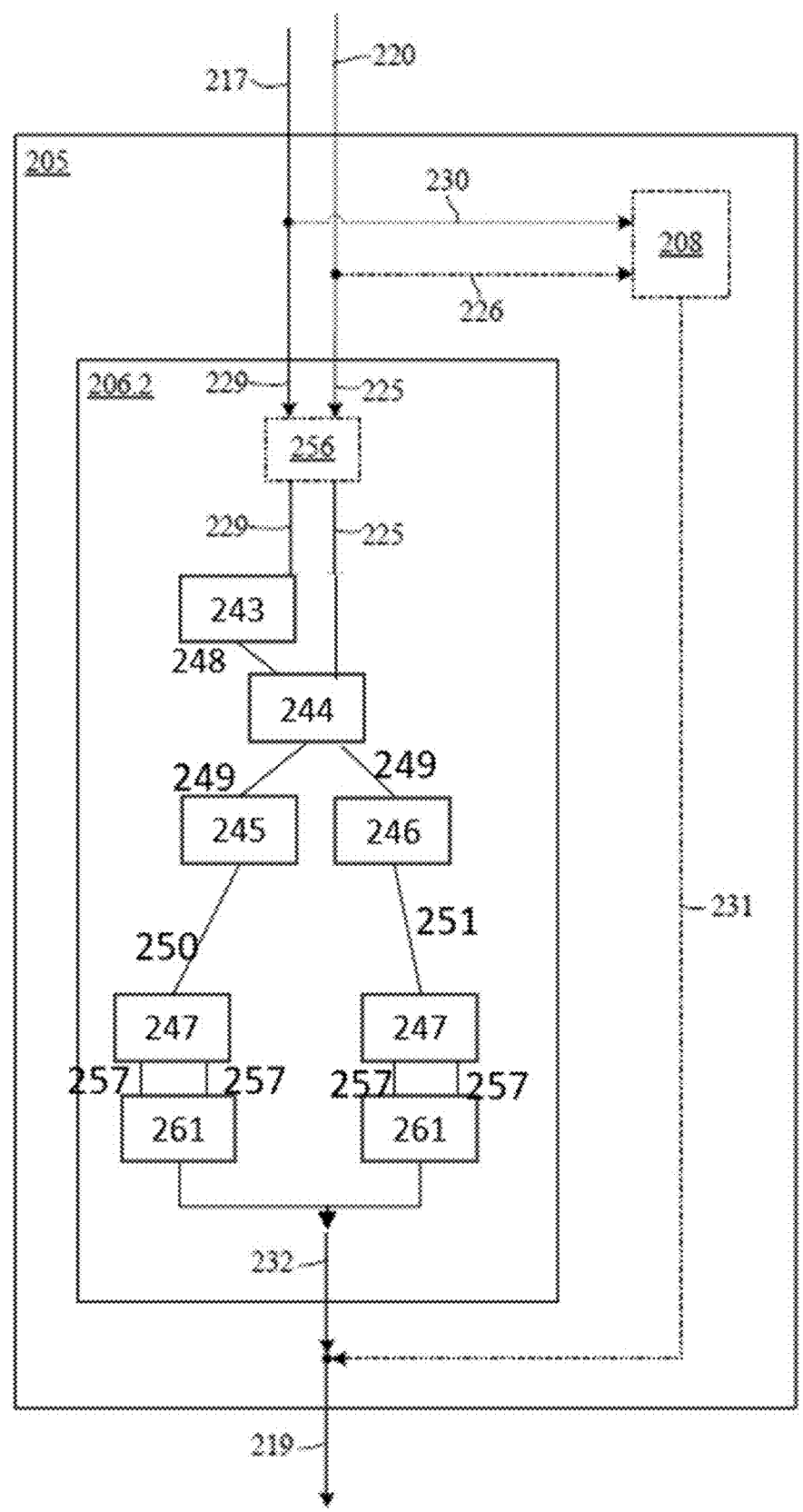
FIG. 5 show a time-frequency offset measurement system.

In an embodiment, with reference to FIG. 5, a second comb timing discriminator 206.2 that includes dispersion compensation unit 256 that receives incoming clock comb signal 229 from incoming optical timing signals 217 and tracking comb signal 225 from tracking optical timing signal 220; and communicates incoming clock comb signal 229 and tracking comb signal 225 each to two separate signal combiner-splitter 252.1 and signal combiner-splitter 252.2. The signal combiner-splitter 252.1 outputs two identical copies of incoming clock comb signal 229.1 and incoming clock comb signal 229.2. The signal combiner-splitter 252.2 outputs two identical copies of tracking comb signal 225.1 and tracking comb signal 225.2. The incoming clock comb signal 229.1 and incoming clock comb signal 229.1 are transmitted to the signal combiner-splitter 252.3 and signal combiner-splitter 252.4 through Fixed delay stage 255.1 and Fixed delay stage 255.2. The tracking comb signal 225.1 is sent to lagging arm delay stage 253 and the tracking comb signal 225.2 is sent to a leading arm delay stage 254. The output of the lagging arm delay stage 253 is the lagging coherent optical pulse trains 258 that is in communication with the signal combiner-splitter 252.3 that received the incoming clock comb signal 229.1 from the Fixed delay stage 255.1. The output of the leading arm delay stage 254 is the leading coherent optical pulse trains 259 that is in communication with the second signal combiner-splitter 252.4 that received the second copy of the incoming clock comb signal 229.2 from the Fixed delay stage 255.2. The output of signal combiner-splitter 252.3 and signal combiner-splitter 252.4 are combined coherent optical pulse trains 257 that are in communication with independent photodetector unit 261.1 and photodetector unit 261.2, respectively. The outputs of photodetector unit 261.1 and photodetector unit 261.2 produces time offset signal 232. In addition, time-frequency offset measurement system 205 can further includes an optional CW heterodyne detector 208. If the optional CW heterodyne detector 208 is included, it receives incoming CW optical signal 230 from incoming optical timing signals 217 and CW optical signal 226 from tracking optical timing signal 220 and produces frequency offset signal 231 from incoming CW optical signal 230 and CW optical signal 226. Time-frequency offset measurement system 205 combines time offset signal 232 from second comb timing discriminator 206.2 and frequency offset signal 231 from CW heterodyne detector 208 into time-frequency offset signals 219.

Figure 6:
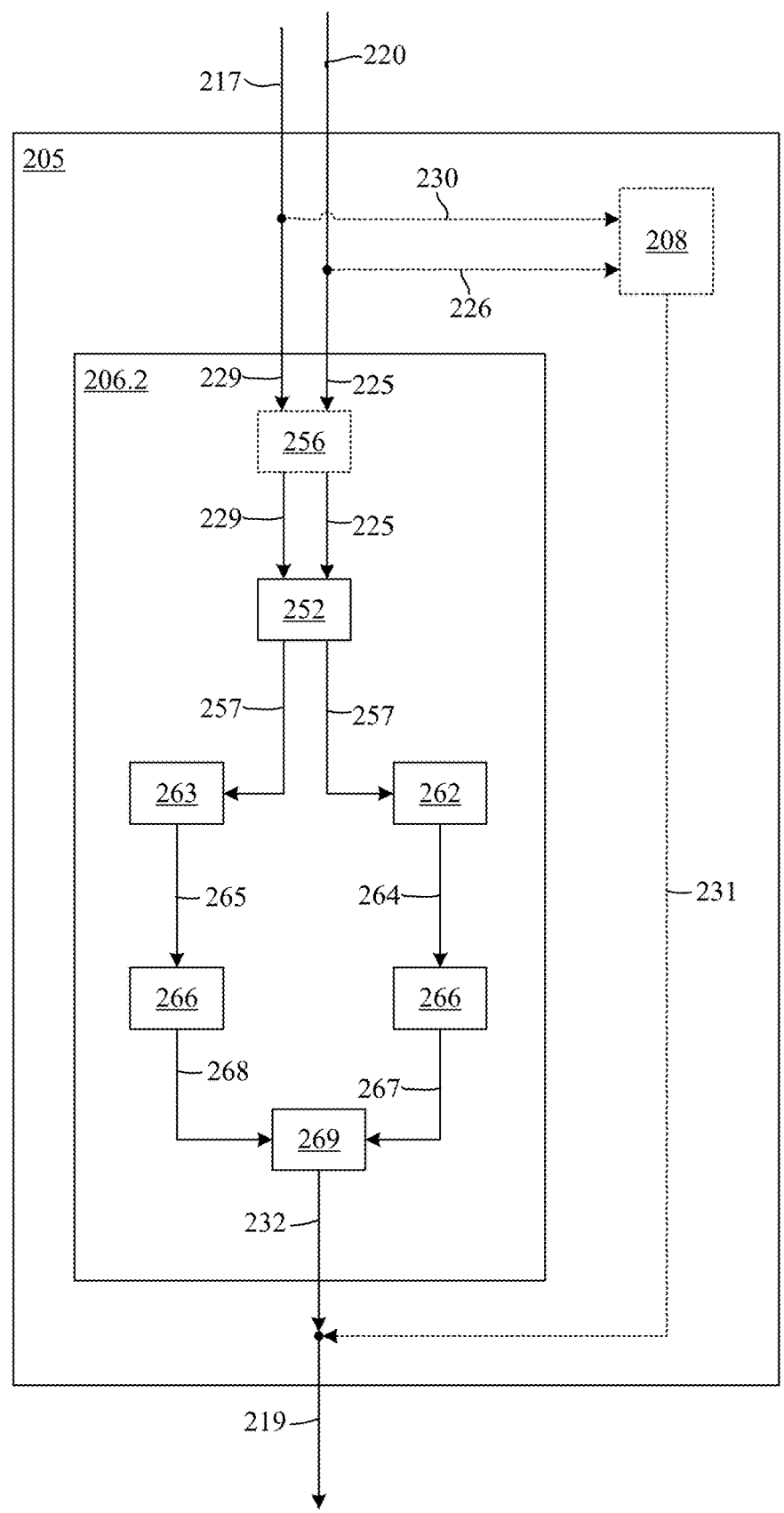
FIG. 6 shows a time-frequency offset measurement system.

In an embodiment, with reference to FIG. 6, time-frequency offset measurement system 205 further includes CW heterodyne detector 208, and second comb timing discriminator 206.2 that includes dispersion compensation unit 256 that receives incoming clock comb signal 229 from incoming optical timing signals 217 and tracking comb signal 225 from tracking optical timing signal 220. Dispersion compensation unit 256 also communicates incoming clock comb signal 229 and tracking comb signal 225 to signal combiner-splitter 252. Signal combiner-splitter 252 is in communication with dispersion compensation unit 256 and receives incoming clock comb signal 229 and tracking comb signal 225 from dispersion compensation unit 256, and produces combined coherent optical pulse trains 257 from incoming clock comb signal 229 and tracking comb signal 225. High-band band pass filter (BPF) 263 is in communication with signal combiner-splitter 252 and receives combined coherent optical pulse trains 257 from signal combiner-splitter 252 and produces high-band optical signal 265 from combined coherent optical pulse trains 257. Low-band BPF 262 is in communication with signal combiner-splitter 252 and receives combined coherent optical pulse trains 257 from signal combiner-splitter 252 and produces low-band optical signal 264 from combined coherent optical pulse trains 257. Pulse interference detector 266 is in communication with high-band BPF 263 and receives high-band optical signal 265 from high-band BPF 263 and produces high-band interference signal 268 from high-band optical signal 265. Second pulse interference detector 266.2 is in communication with low-band BPF 262 and receives low-band optical signal 264 from low-band BPF 262, and produces low-band interference signal 267 from low-band optical signal 264. Phase comparator 269 is in communication with pulse interference detector 266 and second pulse interference detector 266.2 and receives high-band interference signal 268 from pulse interference detector 266, receives low-band interference signal 267 from second pulse interference detector 266.2, and produces time offset signal 232 from high-band interference signal 268 and low-band interference signal 267. CW heterodyne detector 208 receives incoming CW optical signal 230 from incoming optical timing signals 217 and CW optical signal 226 from tracking optical timing signal 220 and produces frequency offset signal 231 from incoming CW optical signal 230 and CW optical signal 226. Time-frequency offset measurement system 205 combines time offset signal 232 from second comb timing discriminator 206.2 and frequency offset signal 231 from CW heterodyne detector 208 into time-frequency offset signals 219.

Figure 7:
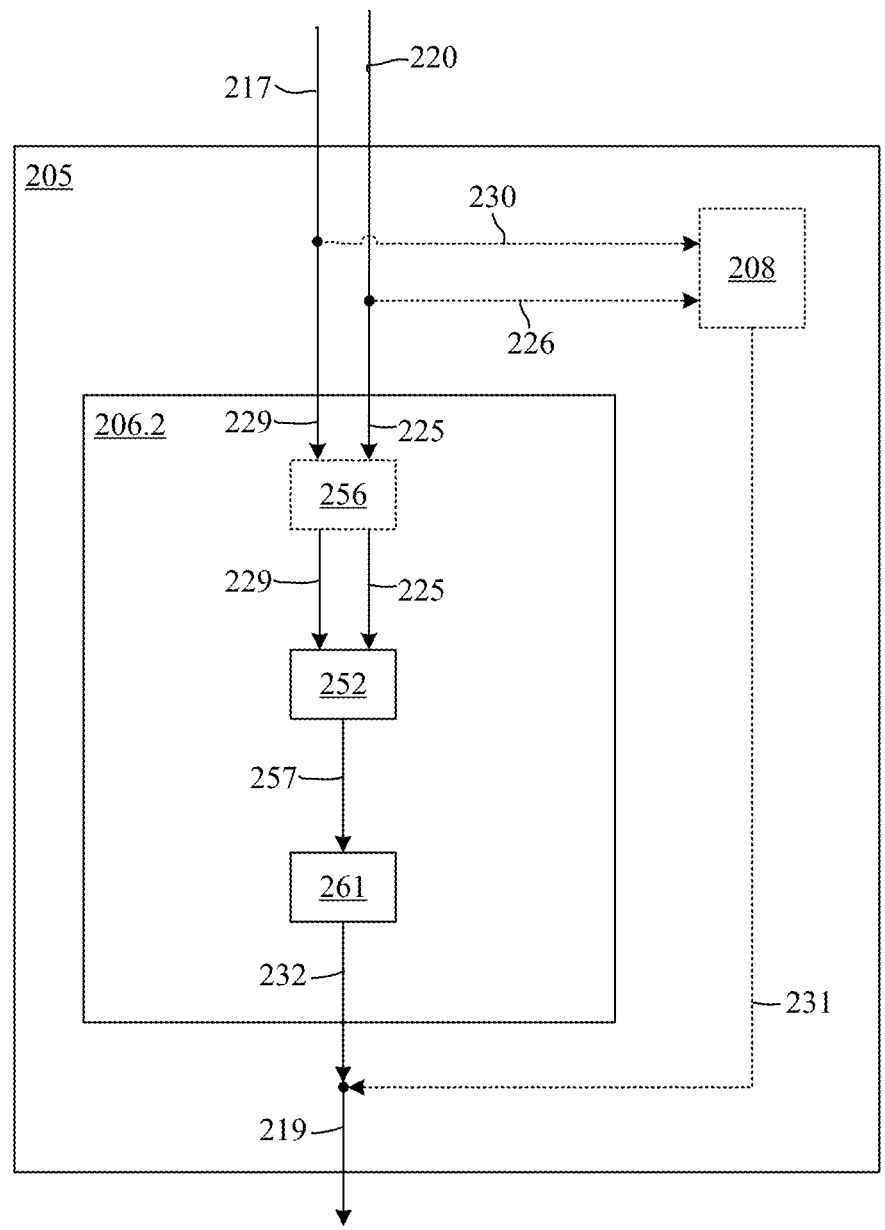
FIG. 7 shows a time-frequency offset measurement system.

In an embodiment, with reference to FIG. 7, time-frequency offset measurement system 205 includes an optional CW heterodyne detector 208, and second comb timing discriminator 206.2 that includes dispersion compensation unit 256 that receives incoming clock comb signal 229 from incoming optical timing signals 217 and tracking comb signal 225 from tracking optical timing signal 220 and communicates incoming clock comb signal 229 and tracking comb signal 225 to signal combiner-splitter 252. Signal combiner-splitter 252 is in communication with dispersion compensation unit 256 and receives incoming clock comb signal 229 and tracking comb signal 225 from dispersion compensation unit 256, and produces combined coherent optical pulse trains 257 from incoming clock comb signal 229 and tracking comb signal 225. Photodetector unit 261 is in communication with signal combiner-splitter 252 and receives combined coherent optical pulse trains 257 from signal combiner-splitter 252 and produces time offset signal 232 from combined coherent optical pulse trains 257. If the optional CW heterodyne detector 208 is included, it receives incoming CW optical signal 230 from incoming optical timing signals 217 and CW optical signal 226 from tracking optical timing signal 220 and produces frequency offset signal 231 from incoming CW optical signal 230 and CW optical signal 226. Time-frequency offset measurement system 205 combines time offset signal 232 from second comb timing discriminator 206.2 and the optional frequency offset signal 231 from CW heterodyne detector 208 into time-frequency offset signals 219.

Figure 8:
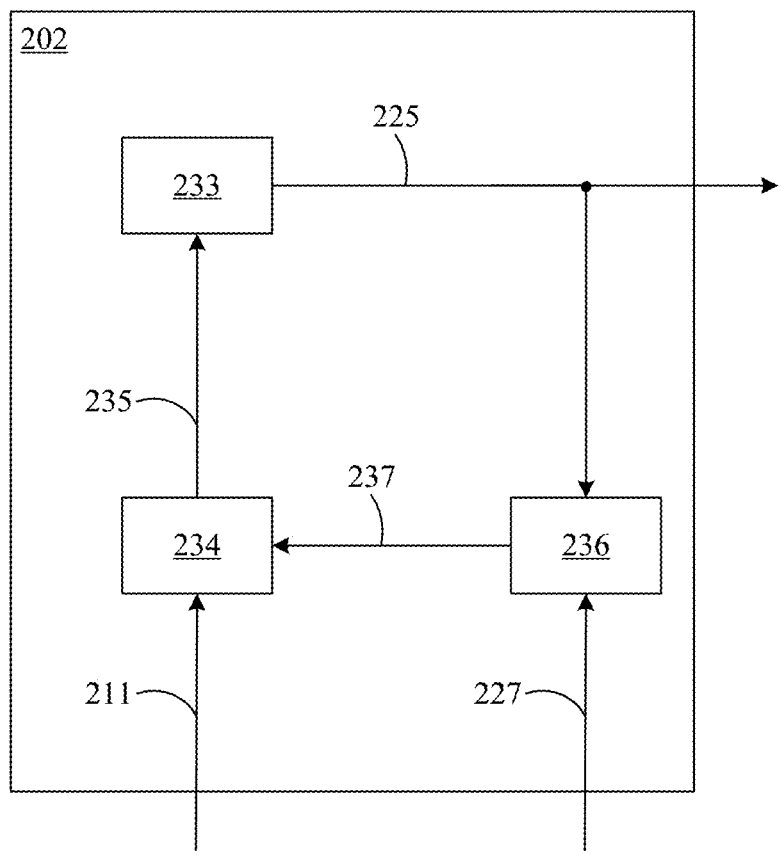
FIG. 8 shows a tracking frequency comb.

In an embodiment, with reference to FIG. 8, tracking frequency comb 202 includes comb digital controller 234 in communication with phase-lock detection unit 236 and that receives tracking comb feedback 211, receives phase-lock detection signals 237 from phase-lock detection signals 237, and produces actuator control signals 235 from tracking comb feedback 211 and phase-lock detection signals 237. Frequency comb optics package 233 is in communication with comb digital controller 234 and receives actuator control signals 235 from comb digital controller 234 and produces tracking comb signal 225 based on actuator control signals 235. Phase-lock detection unit 236 is in communication with frequency comb optics package 233 and comb digital controller 234 and receives tracking comb signal 225 from frequency comb optics package 233, receives frequency reference signal 227 from frequency reference oscillator 201, and produces phase-lock detection signals 237 from tracking comb signal 225 and frequency reference signal 227.

Figure 9:
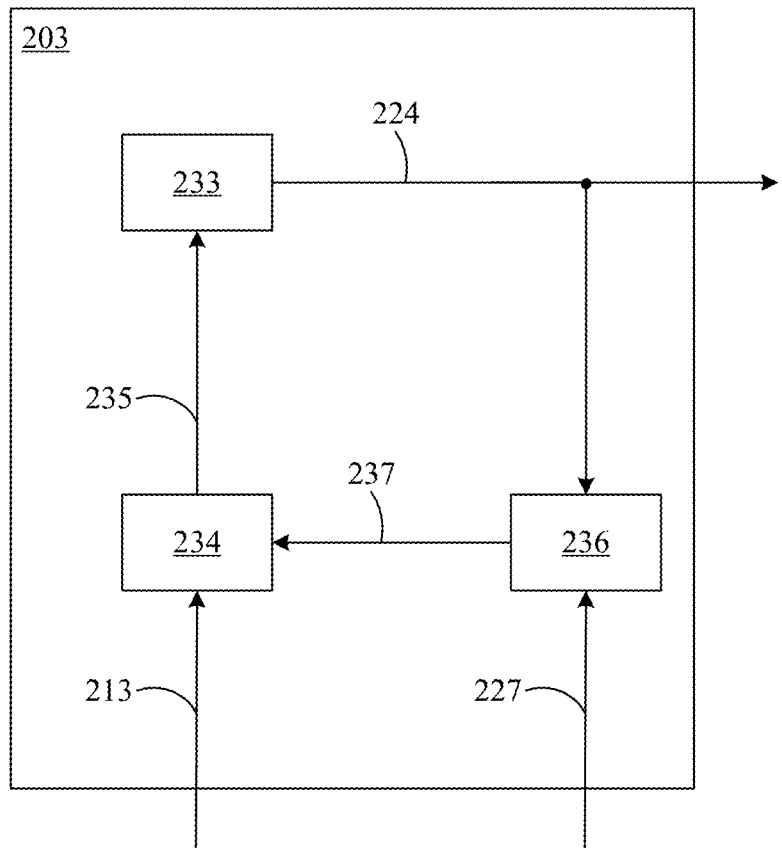
FIG. 9 shows a clock frequency comb.

In an embodiment, with reference to FIG. 9, clock frequency comb 203 includes comb digital controller 234 in communication with frequency reference oscillator 201, phase-lock detection unit 236, and frequency comb optics package 233 and that optionally receives clock comb feedback 213 from two-way processor 241, receives phase-lock detection signals 237 from phase-lock detection unit 236, and produces actuator control signals 235 from clock comb feedback 213 and phase-lock detection signals 237. Frequency comb optics package 233 is in communication with comb digital controller 234 and receives actuator control signals 235 from comb digital controller 234 and produces clock comb signal 224 based on actuator control signals 235. Phase-lock detection unit 236 is in communication with frequency comb optics package 233 and comb digital controller 234 and receives clock comb signal 224 from frequency comb optics package 233, receives frequency reference signal 227 from frequency reference oscillator 201, and produces phase-lock detection signals 237 from clock comb signal 224 and frequency reference signal 227.

Figure 10:
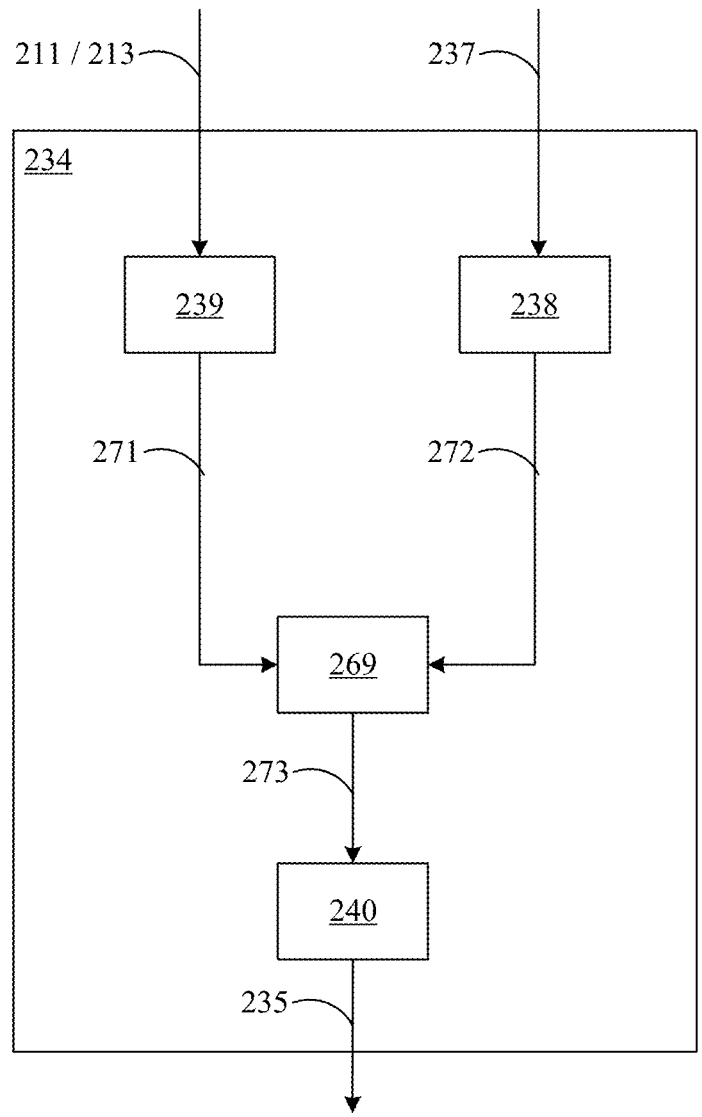
FIG. 10 shows a comb digital controller.

In an embodiment, with reference to FIG. 10, comb digital controller 234 includes phase-frequency agile synthesizer 239 that receives tracking comb feedback 211 or clock comb feedback 213 and produces synthesizer data 271 from tracking comb feedback 211 or clock comb feedback 213. Signal conditioning 238 receives phase-lock detection signals 237, conditions phase-lock detection signals 237 to produce conditioned phase-lock detection signals 272, and communicates conditioned phase-lock detection signals 272 to phase comparator 269. Phase comparator 269 is in communication with phase-frequency agile synthesizer 239 and signal conditioning 238 and receives synthesizer data 271 from phase-frequency agile synthesizer 239 and conditioned phase-lock detection signals 272 from signal conditioning 238, compares synthesizer data 271 to conditioned phase-lock detection signals 272 to produce comparator data 273, and communicates comparator data 273 to loop filter 240. Loop filter 240 is in communication with phase comparator 269 and receives comparator data 273 from phase comparator 269 and produces actuator control signals 235 from comparator data 273.

Figure 11:
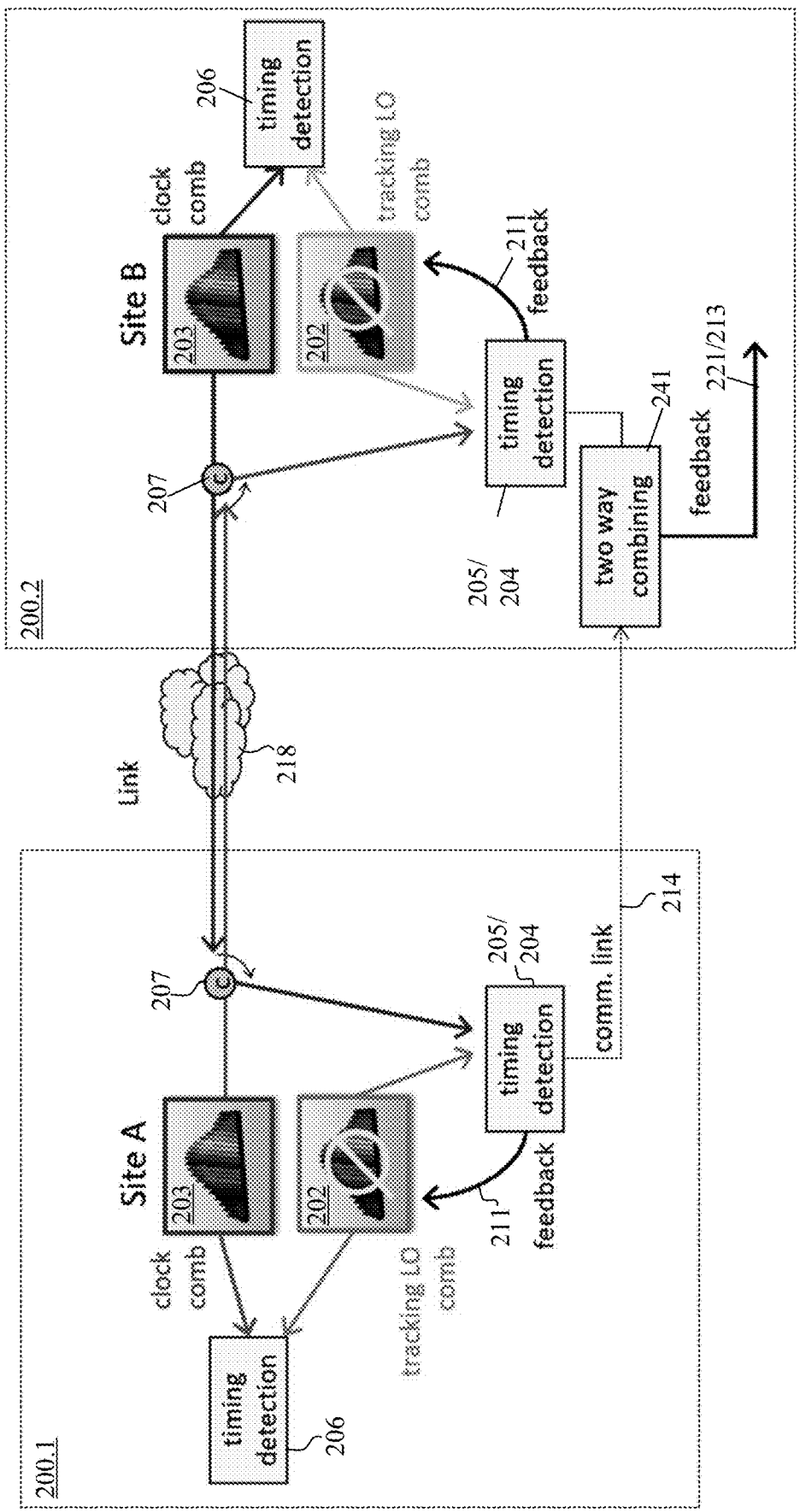
FIG. 11 shows a plurality of synchronizers in communication via an optical link and a communication channel.

With reference to FIG. 2 and FIG. 3, synchronizer 200, also referred to herein as photon-efficient agile comb optical clock synchronizer (PEACOCS), can be connected to other synchronizers 200 in a network of synchronizers that includes at least two PEACOCSs as timing units, wherein each synchronizer 200 includes a clock and tracking frequency comb (202, 203), comb timing discriminator 206, and signal processor-controller 204. With reference to FIG. 11, one of synchronizers 200 is at each end of free-space optical link 218. Within each synchronizer 200, one frequency comb is the clock frequency comb 203, and the second comb is the tracking frequency comb 202. Pulses from the clock frequency comb 203 are sent over the optical link 218 to synchronizer 200 located at the opposite side of optical link 218. The clock frequency comb 203 signal from the link are received in the time-frequency offset measurement system 205 and optically combined with the tracking frequency comb 202 pulses. The time-frequency offset signals 219 from the comb timing discriminator 206 in the time-frequency offset measurement system 205 are directed to the signal processor-controller 204 which returns a relative timing of the received clock comb pulses in the incoming optical timing signals 217 against the tracking frequency comb 202 pulses. These time offsets are recorded and, processed in the signal processor-controller 204 to generate a tracking comb feedback 211 to the tracking frequency comb 202 so that pulses from tracking frequency comb 202 remain overlapped in time and frequency with the received clock comb pulses in the incoming optical timing signals 217. The tracking comb feedback 211 from the signal processor-controller 204 can adjust the phase (time) of the tracking frequency comb 202 arbitrarily from femtoseconds to nanoseconds and its carrier frequency over the full range of the repetition frequency in order to track the incoming clock comb pulses. By performing this operation at both ends of optical link 218, the local one-way data 221 at each site, and specifically the time offset of the tracking frequency comb 202 from the incoming clock comb as measured by the sum of tracking comb feedback 211 and time-frequency offset signals 219 from the comb timing discriminator 206, can be combined to suppress the time-of-flight fluctuations (from atmospheric turbulence or platform motion). This operation yields the time offset between the clock frequency comb 203 at each site to better than a femtosecond. This operation also yields the relative frequencies between the frequency reference oscillator 201 of the two sites at a fractional uncertainty of better than $10^{-18}$. In the case of synchronization, the measured relative frequency offset is used to apply a clock comb feedback 213 to the clock frequency comb 203 at one site to correct the frequency. In the case of synchronization, the measured relative time offset between the clock combs is used apply to a clock comb feedback 213 to the clock frequency comb 203 at one site to correct the time.

Synchronizer 200 achieves this level of performance by the tracking frequency comb 202, time-frequency offset measurement system 205, and the signal processor-controller 204 that together allow the tracking frequency comb 202 to lock onto the incoming clock frequency comb 203 signal from the opposite site at extremely low received powers, corresponding to much less than one photon per comb pulse. This is accomplished by shot-noise limited detection within the time-frequency offset measurement system 205, followed by coherent integration of the tracking optical timing signal 220 over a time window of the turbulence-limited optical coherence time across the optical link 218. With optional inclusion of CW laser 242 and CW heterodyne detector 208, the integration time of the signal from comb timing discriminator 206 can be extended to longer integration times than the turbulence-limited optical coherence time. The combination of the shot-noise limited detection and coherent integration yields an enhancement of 5000-times signal-to-noise over conventional optical-based time transfer without penalty in timing performance. The signal-to-noise enhancement is advantageous for long distance operation, wherein an operational range of the optical link 218 is increased by 70-times for a given transmit power budget as a result of the tracking frequency comb 202, time-frequency offset measurement system 205, and the signal processor-controller 204.

Detection of an arrival time of the received clock frequency comb 203 pulses from remote site synchronizer 200.2 at synchronizer 200 relative to the local tracking frequency comb 202 pulses can be accomplished in synchronizer 200 by timing discriminator comb timing discriminator 206. Comb timing discriminator 206 can include two-tap interferometer (FIG. 4) constructed from free-space or fiber-optic components. The two-tap interferometer (FIG. 4) detects relative time offset of one pulse from another without distortion of measurement by amplitude variations by comparison of the heterodyne detection from the lagging coherent optical pulse trains 258 and leading coherent optical pulse trains 259. In an embodiment, comb timing discriminator 206 includes two-color interferometer (FIG. 6) constructed from free-space or fiber-optic components. The two-color interferometer (FIG. 6) detects the relative time offset of one pulse from another without distortion of measurement by amplitude variations by comparison of the heterodyne detection from the low-band optical signal 264 and high-band optical signal 265. In an embodiment, comb timing discriminator 206 includes a single-tap interferometer (FIG. 7) constructed from free-space or fiber-optic components. The single-tap interferometer (FIG. 7) detects the relative time offset of one pulse from another without distortion of measurement by amplitude variations by one of two methods. First, a dither can be introduced in timing of the tracking frequency comb 202 with a dither frequency higher than the typical amplitude fluctuation frequency, and an average time offset over one cycle of this dither that can be extracted via processing by the signal processor-controller 204. Second, with the optional inclusion of the CW laser 242 and CW heterodyne detector 208, then simultaneous amplitude measurements of the signal from the CW heterodyne detector 208 are combined with the signals from the comb timing discriminator 206 in the time-frequency offset signals 219 that can be analyzed by the signal processor-controller 204 to generate the relative time offset of the incoming clock comb pulse and local tracking comb pulse without distortion of measurement by amplitude variations.

Synchronizer 200 provides initial acquisition of the received clock frequency comb 203 pulses from remote site synchronizer 200.2 at synchronizer 200 relative to the local tracking frequency comb 202 pulses. The acquisition mode is controlled by algorithms implemented on the signal processor-controller 204, in which the timing of the tracking frequency comb 202 pulses is repeatedly scanned over up to the full time window set by the inverse repetition frequency of the frequency combs. The signal processor-controller 204 provide rapid switching between this acquisition mode and the steady-state tracking operational mode wherein the tracking frequency comb 202 is locked onto the clock frequency comb 203 as described in the above two paragraphs. In the event of long signal dropouts from turbulence, or obstructions or any other event, the signal processor-controller 204 will revert to acquisition mode.

Synchronizer 200 provides absolute time comparison of the clock frequency comb 203 pulses at Synchronizer 200 and the clock frequency comb 203 pulses at the remote site synchronizer 200.2 by initial calibration of the fixed time delay offsets within the free-space or fiber optic paths of the Synchronizer 200 and by periodic measurements of the time offset between the clock frequency comb 203 and the tracking frequency comb 202 through a second comb timing discriminator 206, whose signals are recorded and processed in the signal processor-controller 204. In this way, any phase slips in the phase locks of either the clock frequency comb 203 or the tracking frequency comb 202 at either site are removed and do not cause ambiguity in the time comparison. In addition, to avoid the time ambiguity equal to the inverse comb repetition frequency, which is otherwise inherent in the time-frequency offset signals 219 output by the comb timing discriminator 206, the communicator 215 system is used to implement a standard two-way time transfer protocol that measures the relative time offset without ambiguity and with a precision that is below the inverse repetition frequency of the clock frequency comb 203.

Components of synchronizer 200 can be made from and include various materials. Frequency reference oscillator 201 can an optical or radiofrequency (RF) oscillator. Exemplary optical oscillators include a narrow-linewidth laser, cavity-stabilized laser, cavity-stabilized laser steered to an atomic transition, and the like. Exemplary RF oscillators include a quartz oscillator, dielectric resonator oscillator (DRO), RF oscillator optionally steered to an atomic transition, and the like. Various oscillators are described in U.S. Pat. Nos. 10,389,514 and 9,557,625, the disclosures of each are incorporated by reference in their entirety. Frequency reference oscillator 201 produces frequency reference signal 227 that can have a frequency from 20 kilohertz (kHz) to 700 terahertz (THz), specifically from 1 gigahertz (GHz) to 500 THz, and more specifically from 500 GHz to 400 THz.

It should be appreciated that synchronizer 200 performs time-frequency transfer over optical link 218. It can be operated in one of four modes: frequency comparison, time comparison, frequency syntonization, and time synchronization. The latter two require the real-time communication channel 214 between the two sites, the two-way processor 241, and clock comb feedback 213. In certain embodiments, the outgoing optical timing signals 216 includes both the clock comb signal 224 and the CW optical signal 226 that is transferred over optical link 218 as synchronization data 270 between connected synchronizers 200. For time comparison or synchronization, the communication channel 214 is also used to implement a conventional two-way time transfer protocol between the synchronizers 200.

To accomplish synchronizing transfer over optical link 218, synchronizer 200 includes clock frequency comb 203. Clock frequency comb 203 is a self-referenced optical frequency comb that produces clock comb signal 224. Exemplary components of the clock frequency comb 203 are shown in FIG. 9. Clock comb signal 224 is an optical pulse train output from clock frequency comb 203 that can be filtered to a selected bandwidth and can have a wavelength that is, e.g., around 1550 nm. It is contemplated that clock comb signal 224 can be amplified to provide additional power to the outgoing clock comb signal 224 or to an external user. Additionally, clock frequency comb 203 produces clock output 210. Clock output 210 is an optical pulse train or RF pulse train output signal and can include data for comb locking parameters that define RF or optical frequencies with respect to frequency reference signal 227. Clock output 210 can include a counter for the number of optical or RF pulses that is used to define the local time scale.

Tracking frequency comb 202 also receives frequency reference signal 227 from frequency reference oscillator 201 and can include control electronics that deterministically alter a phase or timing of output of tracking frequency comb 202 relative to frequency reference signal 227. Exemplary components of tracking frequency comb 202 are shown in FIG. 8. Here, tracking frequency comb 202 produces tracking comb signal 225. It is contemplated that tracking frequency comb 202 also can produce a parallel output signal that contains data, wherein the data can be corrections for a paper clock (e.g., real-time or delayed). An exemplary paper clock, outputs tracking comb signal 225 and a similar parallel output signal containing data. Tracking comb signal 225 is an optical pulse train output from tracking frequency comb 202 that can be filtered to match a bandwidth of clock comb signal 224.

With reference, e.g., to FIG. 1, FIG. 2, FIG. 4, FIG. 6, and FIG. 7, comb timing discriminator 206 receives a plurality of signals and interferes input comb pulse streams (e.g., incoming clock comb signal 229 and tracking comb signal 225 or the clock frequency comb 203 and tracking comb signal 225) to produce signals (e.g., time offset signal 232 or the clock comb-tracking comb time offset 212,) that are analyzed to determine a relative time offset of incoming comb pulse streams. In this regard, clock comb-tracking comb time offset 212 can be such an output of comb timing discriminator 206.

Tracking optical timing source 209 can be locked onto an incoming optical timing signal (e.g., clock comb signal 224, frequency reference signal 227). Locking can be actively locking or virtually locking by tracking any difference. Tracking optical timing source 209 can include tracking frequency comb 202 and optionally a continuous wave (CW) coherent laser 242 that can be phase-locked with a known frequency to frequency reference oscillator 201 or tracking frequency comb 202. Tracking optical timing source 209 produces tracking optical timing signal 220 that can include tracking comb signal 225 and optionally CW optical signal 226.

Time-frequency offset measurement system 205 measures a relative time and frequency of incoming optical timing signals such as incoming optical timing signals 217 relative to tracking optical timing signal 220. In time-frequency offset measurement system 205, comb timing discriminator 206 measures the relative time offset between the incoming clock comb signal 229 of incoming optical timing signals 217 and the tracking comb signal 225 of tracking optical timing signal 220 from tracking frequency comb 202. In time-frequency offset measurement system 205, CW heterodyne detector 208 can be a photoreceiver (e.g., balanced or otherwise) that detects a heterodyne signal between an output of CW laser 242 carried by CW optical signal 226 and incoming signal from second synchronizer 200 of incoming CW optical signal 230 carried by the incoming optical timing signals 217. Time-frequency offset measurement system 205 produces time-frequency offset signals 219 that is processed by signal processor-controller 204. Time-frequency offset signals 219 includes time offset signal 232 from second comb timing discriminator 206.2 and frequency offset signal 231 from CW heterodyne detector 208.

Bidirectional terminal 207 is a free-space terminal for physical acquisition and tracking of a free-space optical link 218 (e.g., a single-mode optical link) among first synchronizer 200.1 and second synchronizer 200.2. Bidirectional terminal 207 can also include a beacon laser or other article for acquiring and tracking another synchronizer. Bidirectional terminal 207 can combine outgoing optical timing signals 216 (e.g., clock comb signal 224, CW optical signal 226) by a splitter, combiner, or wavelength division multiplexer or can divide incoming optical timing signals 217 for input to time-frequency offset measurement system 205. If optical link 218 is over fiber optics rather than free-space, Bidirectional terminal 207 is a fiber-optic terminal that similarly combine outgoing optical timing signals 216 and divides incoming optical timing signals 217.

Signal processor-controller 204 receives time-frequency offset signals 219 from time-frequency offset measurement system 205. Signal processor-controller 204 performs various functions that include communicating control signals to adjust the frequency or phase (e.g., timing) of tracking frequency comb 202 or clock frequency comb 203; communicating local one-way data 221 and side information 228 from communicator 215, wherein side information 228 can include data such as current comb parameters; receiving one-way data and side information from a remote site (e.g., second synchronizer 200.2). Signal processor-controller 204 also can transmits and receive data from two-way processor 241 to provide information on relative time-of-flight, clock timing difference, or doppler shift between the local and remote site. Signal processor-controller 204 can apply a tunable low-pass filter to time-frequency offset signals 219 to improve signal-to-noise ratio. A center frequency of the low-pass filter can be tracked dynamically based on the available information a priori or from data received via communication channel 214 or based on time-frequency offset signals 219. Data can be decimated to reduce computational effort after filtering. The bandwidth of the low-pass filter can be adjusted depending on a current measured optical coherence time across optical link 218. Optionally, comb time discriminator signals can have an increased bandwidth by using knowledge from the CW heterodyne beat signal to extend the optical coherence time. Signal processor-controller 204 can process signals from time-frequency offset signals 219 to estimate the time shift in seconds between tracking frequency comb 202 and incoming clock comb signal 229. Signal processor-controller 204 process signals from time-frequency offset signals 219 and estimate an excess frequency shift (i.e., a measured frequency shift compared to an expected center frequency of the low-pass filter) between incoming optical timing signals 217 and tracking optical timing signal 220. This frequency shift can be present between comb signals and CW heterodyne signals. Signal processor-controller 204 can implement a tracking mode, wherein the processed time-frequency signals are used to feedback to tracking frequency comb 202 so that its time offset against the incoming clock comb signal is driven towards zero. Signal processor-controller 204 can implement an acquisition mode, wherein a search algorithm is performed over frequency and time for initial acquisition of clock comb-tracking comb time offset 212 and time-frequency offset signals 219. The search algorithm can use side information 228 received from communicator 215. Signal processor-controller 204 tracks signal loss on time-frequency offset signals 219 and determines when to switch from tracking mode to search mode. Depending on a duration of signal loss, the signal process can select different search mode patterns to reduce the acquisition time.

Signal processor-controller 204 produces tracking comb feedback 211. Tracking comb feedback 211 are control signals that are used to adjust phase and time of tracking frequency comb 202, e.g., as provided with reference to tracking frequency comb 202 in FIG. 8. As a frequency comb, tracking frequency comb 202 has two degrees-of-freedom that can be its carrier phase/frequency (i.e., a frequency of one defined comb tooth in the center of the transmitted optical frequency band) and its pulse repetition phase/timing. The Tracking comb feedback 211 controls both these degrees of freedom, e.g., to adjust the phase/timing of the pulses from tracking frequency comb 202 to align with the incoming clock comb signal 229 pulses and to simultaneously adjust the carrier frequency of the tracking frequency comb 202 to be offset from the carrier frequency of the tracking frequency comb 202 in order to match the center frequency of the low pass filter on the time-frequency offset signals 219, as implemented in the signal processor-controller 204.

Signal processor-controller 204 also produces local one-way data 221. Local one-way data 221 is a combined data stream from the site, including the clock comb-tracking comb time offset 212, time-frequency offset signals 219, diagnostics and phase-lock detection signals 237 of tracking frequency comb 202 and clock frequency comb 203, tracking comb feedback 211, clock comb feedback 213, and additional timing data from the Communicator 215 if implemented as a two-way time transfer over the communication channel 214 to remove ambiguities. Tracking comb feedback 211, time offset signal 232 from the time-frequency offset signals 219, clock comb-tracking comb time offset 212, and any transceiver calibration offsets are combined to give the one-way time-of-arrival of the incoming clock comb signal 229 compared to the clock frequency comb 203.

Communicator 215 communicates with signal processor-controller 204 and provides communication along communication channel 214 between first synchronizer 200.1 and second synchronizer 200.2. Communicator 215 provides coarse timing data to remove time or frequency ambiguities in outgoing optical timing signals 216 by two-way time transfer over a direct RF channel or an optical communication channel. Communicator 215 exchanges one-way time data at each site (e.g., synchronizer 200.1, synchronizer 200.2, . . . , synchronizer 200.*m*). Communicator 215 and communication channel 214 can be implemented in various ways, including as separate RF or microwave communication links; by a separate optical communication link that can optionally use bidirectional terminal 207 and optical link 218 as the optical timing signals; by inserting a phase or amplitude modulator into a communication path of CW optical signal 226 to apply data formatting to the outgoing signal at each site, where the data is demodulated from the incoming CW signal in CW heterodyne detector 208 by communicator 215; by inserting a phase or amplitude modulator into the communication path for clock comb signal 224 to bidirectional terminal 207 to data format outgoing clock comb light at each site, where the data can be demodulated in comb timing discriminator 206 by communicator 215.

Remote one-way data 222 is produced by communicator 215 from local one-way data 221 from the other side (e.g., synchronizer 200.2) that is sent over communication channel 214 via communicator 215.

Two-way processor 241 receives local one-way data 221 from signal processor-controller 204. Two-way processor 241 combines the two one-way data streams (local one-way data 221, remote one-way data 222) to generate two-way output data 223 by applying two-way time transfer equations with corrections for relativistic and systematic effects. Two-way output data 223 includes data related to two-way time transfer including outputs for time and frequency offset between clock frequency comb 203 at synchronizer 200 and at the remote site (e.g., synchronizer 200.1, synchronizer 200.2, . . . , synchronizer 200.*m*), and the time-of-flight between synchronizer 200 and the remote site (e.g., synchronizer 200.1, synchronizer 200.2, . . . , synchronizer 200.*m*) over optical link 218, or the relative velocity between synchronizer 200 and the remote site (e.g., synchronizer 200.1, synchronizer 200.2, . . . , synchronizer 200.*m*). Two-way output data 223 also includes data on signal amplitudes, diagnostic data, and the like for synchronizer 200, synchronizer 200.1, . . . , synchronizer 200.*m*.

Two-way processor 241 also produces clock comb feedback 213 that includes control signals to adjust a phase/timing and frequency of clock frequency comb 203. It is contemplated that clock comb feedback 213 can include control of both degrees-of-freedom of the clock frequency comb 203, which we can take as its carrier phase/frequency (i.e. frequency of one defined comb tooth in the center of the transmitted optical frequency band) and its pulse repetition phase/timing as for tracking frequency comb 202. The feedback could be used to adjust the clock comb signal 224 itself or to provide additional correction data to the clock output 210.

In an embodiment, synchronizer 200 includes tracking frequency comb 202 and clock frequency comb 203 that are identical with mapping of input control signals to provide an agile comb, as shown in FIGS. 7 and 8. Here, for tracking frequency comb 202 or clock frequency comb 203, a common element is that the agile comb is phase-locked to a sum of frequency reference signal 227 and arbitrary control signals, e.g. clock comb feedback 213 or tracking comb feedback 211. The phase-lock can be performed by comb digital controller 234, by a phase synthesizer or frequency agile synthesizer. Such a synthesizer can be implemented by analog electronics, digital electronics as a direct-digital synthesizer (DDS), or a combination thereof. In this configuration, control signals distinguish tracking frequency comb 202 and clock frequency comb 203, wherein tracking frequency comb 202 tracks incoming clock comb signal 229, which itself is the clock comb signal 224 from the remote site combined with any time-of-flight delay over the optical link 218, and clock frequency comb 203 is adjusted to track just the timing of the clock comb signal 224 at the remote clock, as calculated by the two-way processor 241.

Further, the side information 228 at each site consists of the local one-way data 221 and other information available at the site including but not limited to its location, orientation and velocity from navigational information, time-of-day, environmental conditions, and the like.

The incoming clock comb signal 229 is clock comb signal 224 of the outgoing optical timing signals 216 at the remote site after traversing the optical link 218. The incoming CW optical signal 230 is the CW optical signal 226 of the outgoing optical timing signals 216 at the remote site after traversing the optical link 218.

The frequency offset signal 231 is the heterodyne signal from the heterodyne detection of the incoming CW optical signal 230 and CW optical signal 226 by the CW heterodyne detector 208. The time offset signal 232 is the output of the comb timing discriminator 206 that provides the time and frequency offset between the pulses of the two frequency combs input to the comb timing discriminator 206.

The continuous wave CW laser 242 is a single-mode laser (e.g., a fiber laser or external cavity semiconductor laser or diode laser) that is phase-locked to tooth of clock frequency comb 203 so that it has a known and stable optical frequency.

The frequency comb optics package 233 is the physical optical system that generates the tracking comb signal 225 or the clock comb signal 224 (e.g. a mode-locked laser including any pump lasers, followed by a supercontinuum generation model and including any actuators for control of the frequency comb output). The actuator control signals 235 are the voltage signals that are sent to the actuators in the frequency comb optics package 233 to adjust the two degrees-of-freedom of the frequency comb. The phase-lock detection unit 236 includes the opto-electronics for detection of the carrier-envelope offset frequency of the comb. If the frequency reference signal 227 is optical, the phase-lock detection unit 236 includes the heterodyne detection of a comb tooth compared to the frequency reference signal 227. If the frequency reference signal 227 is a microwave signal, the phase-lock detection unit 236 includes the detection of a harmonic of the comb repetition frequency and its phase comparison with the frequency reference signal 227. If frequency reference signal 227 includes a microwave and optical reference signal, phase-lock detection unit 236 includes both the detection of a harmonic of the comb repetition frequency and its phase comparison with the microwave reference in the frequency reference signal 227, and heterodyne detection of a comb tooth compared to the optical reference frequency reference signal 227. The phase-lock detection signals 237 are the two measured beat signals output by the phase-lock detection unit 236 that are then processed in the comb digital controller 234.

As part of the comb digital controller 234, (FIG. 10) the signal conditioning 238 includes any linear filtering to the input signals to produce the conditioned phase-lock detection signals 272, the phase-frequency agile synthesizer 239 generates an rf synthesizer data 271 with an adjustable phase and frequency, the loop filter 240 is a proportional-integral-derivative loop filter as used in feedback systems, the phase comparator 269 compares the phase of the two input signals where this phase is the comparator data 273.

As part of the time-frequency offset measurement system 205 shown in FIG. 4, FIG. 6, and FIG. 7, the signal combiner-splitter 252 is a four-port free-space or fiber-optic 50/50 combiner. With a single input (e.g. the incoming clock comb signal 229 or the tracking comb signal 225), its output is two copies of the input signals (the incoming clock comb signal 229.1 and incoming clock comb signal 229.2 or tracking comb signal 225.1 and tracking comb signal 225.2). With two inputs (e.g. the incoming clock comb signal 229 and the tracking comb signal 225), its output is two copies of combined coherent optical pulse trains 257. The dispersion compensation unit 256 is a fiber-optic or other medium with dispersion whose length is adjusted such that the relative dispersion between the two input comb pulses (from incoming clock comb signal 229 and tracking comb signal 225 or clock comb signal 224 and tracking comb signal 225), is close to zero.

As part of the time-frequency offset measurement system 205 embodied in FIG. 4, the lagging arm delay stage 253 and leading arm delay stage 254 are both just delay lines in fiber optic or free space where the difference in their delay is equal to some fraction of the pulse width, which is typically on the order of 0.5 psec. the fixed delay stage 255 is a delay line where all instances have the same delay. The delayed optical output of the lagging arm delay stage 253 is the lagging coherent optical pulse trains 258 and the delayed optical output of the leading arm delay stage 254 is the leading coherent optical pulse trains 259. The output of each signal combiner-splitter 252 is combined coherent optical pulse trains 257 of the two input signals. The photodetector unit 261 and be a single or balanced photodetector.

As part of the time-frequency offset measurement system 205, ninety-degree polarization rotator 243 rotates the polarization of the input incoming clock comb signal 229 by ninety degrees to generate rotated comb pulse train 248. The polarization preserving combiner 244 combines the tracking and clock comb pulse trains with now perpendicular polarizations to generate two copies of the polarization combined pulse trains 249.1 and polarization combined pulse trains 249.2. The polarization combined pulse trains 249.1 is transmitted through the birefringent lagging arm delay stage 245 to create a fixed delay between the tracking and comb pulse trains. Similarly, the polarization combined pulse trains 249.2 is transmitted through the birefringent leading arm delay stage 246 to create a different fixed delay between the tracking and comb pulse trains. The lengths of the birefringent lagging arm delay stage 245 and birefringent leading arm delay stage 246 are set such that their differential delay between the tracking and comb pulse trains is fraction of the pulse width, typically around 0.5 psec. The output lagging polarization combined pulse trains 250 is sent into a forty-five-degree polarization splitter 247 that combines the orthogonally polarized tracking and clock combs at 45 degrees to generate polarization aligned combined coherent optical pulse trains 257.1 that are photo detected by a balanced (or non-balanced) photodetector unit 261. The output leading polarization combined pulse trains 251 is sent into a second forty-five-degree polarization splitter 247 that combines the orthogonally polarized tracking and clock combs at 45 degrees to generate polarization aligned combined coherent optical pulse trains 257.2 that are photo detected by a balanced (or non-balanced) photodetector unit 261.2. The outputs of the photodetector unit 261.1 and photodetector unit 261.1 are the time offset signal 232.

As part of the time-frequency offset measurement system 205 embodied in FIG. 6, the low-band BPF 262 is a low pass optical bandpass filter that transmits optical frequencies below some center frequency and does not transmit optical frequencies above some center frequency. The filtered output of the low-band BPF 262 is the low-band optical signal 264. The high-band BPF 263 is a high pass optical bandpass filter that transmits optical frequencies below some center frequency and does not transmit optical frequencies above some center frequency. The filtered output of the high-band BPF 263 is the high-band optical signal 265. The center frequency of both bandpass filters is selected to be near the center of the optical frequency spectrum of both the clock and tracking comb pulse trains. The pulse interference detector 266 is a balanced or single photoreceiver whose voltage output is the low-band interference signal 267 or high-band interference signal 268.

Synchronizer 200 can be made in various ways. Synchronizer 200 includes a number of optical and electrical components, wherein such components can be interconnected and placed in communication (e.g., optical communication, electrical communication, and the like) by physical or free-space interconnects. The components can be disposed on mounts that can be disposed on a bulkhead for alignment and physical compartmentalization. As a result, synchronizer 200 can be disposed in a terrestrial environment or space environment.

In an embodiment, a process for making synchronizer 200 includes: providing frequency reference oscillator 201, clock frequency comb 203, tracking frequency comb 202, bidirectional terminal 207, comb timing discriminator 206, tracking optical timing source 209, time-frequency offset measurement system 205, signal processor-controller 204, optionally two-way processor 241 and communicator 215; connecting clock frequency comb 203 to frequency reference oscillator 201 by free-space or fiber optic path; connecting tracking optical timing source 209 to frequency reference oscillator 201 by free-space or fiber optic path; connecting tracking optical timing source 209 to comb timing discriminator 206 by free-space or fiber optic path; connecting clock frequency comb 203 to comb timing discriminator 206 by free-space or fiber optic path; connecting comb timing discriminator 206 to signal processor-controller 204 by co-axial or other wired connection; connecting clock frequency comb 203 to bidirectional terminal 207 by free-space or fiber optic path; connecting bidirectional terminal 207 to tracking optical timing source 209 by free-space or fiber optic path; connecting signal processor-controller 204 to time-frequency offset measurement system 205 by co-axial or other wired connection; connecting signal processor-controller 204 to tracking optical timing source 209 by co-axial or other wired connection; connecting time-frequency offset measurement system 205 to tracking optical timing source 209 by free-space or fiber optic path; connecting time-frequency offset measurement system 205 to bidirectional terminal 207 by free-space or fiber optic path; connecting two-way processor 241 to signal processor-controller 204 by co-axial or other wired connection; connecting two-way processor 241 to clock frequency comb 203 by co-axial or other wired connection; connecting signal processor-controller 204 to communicator 215 by co-axial or other wired connection; connecting two-way processor 241 to communicator 215 by co-axial or other wired connection; connecting bidirectional terminal 207 to second synchronizer 200.2 either over free space by pointing and tracking of the bidirectional terminal 207 such that the outgoing optical timing signals 216 at one synchronizer is coupled into the fiber optic carrying the incoming optical timing signals 217 at the other synchronizer or over single-mode fiber optic and connecting communicator 215 to second synchronizer 200.2 over the communication channel 214 by a free-space terminal for a free-space link or over fiber optic for a fiber link or over coaxial cable for a wired link. The fiber optic connections can be made by polarization maintaining single-mode fiber or single-mode fiber.

The process for making synchronizer 200 also can include calibration of the time delays for the signals throughout synchronizer 200 by use of an optical time domain reflectometer, or equivalent measurement instrument, in both the optical domain for fiber-optic or free-space optical connections and an time domain reflectometer, or similar instrument, in the RF domain for coaxial or wired connections. The process for making synchronizer 200 also can include combining the function of the communicator 215 with the outgoing optical timing signals 216 by inserting a phase or amplitude modulator on either the outgoing clock comb signal 224 or outgoing CW optical signal 226 prior to the bidirectional terminal 207.

Synchronizer 200 has numerous advantageous and unexpected benefits and uses. In an embodiment, a process for synchronizing transfer over an optical link with synchronizer 200 includes: producing, by frequency reference oscillator 201, frequency reference signal 227; receives, by tracking frequency comb 202, frequency reference signal 227 from frequency reference oscillator 201; produces, by tracking frequency comb 202, tracking comb signal 225; receiving, by tracking optical timing source 209, tracking comb feedback 211 from signal processor-controller 204; producing, by tracking optical timing source 209, tracking optical timing signal 220 based on tracking comb feedback 211; receiving, by comb timing discriminator 206, tracking comb signal 225 from tracking optical timing source 209; receiving by comb timing discriminator 206, clock comb signal 224 from clock frequency comb 203; producing, by comb timing discriminator 206, clock comb-tracking comb time offset 212 from clock comb signal 224 and tracking comb signal 225; receiving, by clock frequency comb 203, frequency reference signal 227 from frequency reference oscillator 201; producing, by clock frequency comb 203, clock comb signal 224 based on frequency reference signal 227; producing, by clock frequency comb 203, clock output 210 based on frequency reference signal 227; communicating, by clock frequency comb 203, clock comb signal 224 to comb timing discriminator 206 and bidirectional terminal 207; receiving, by signal processor-controller 204, clock comb-tracking comb time offset 212 from comb timing discriminator 206; receiving, by signal processor-controller 204, time-frequency offset signals 219 from time-frequency offset measurement system 205; producing, by signal processor-controller 204 based on clock comb-tracking comb time offset 212 and time-frequency offset signals 219, tracking comb feedback 211 and local one-way data 221; receiving, by time-frequency offset measurement system 205, tracking optical timing signal 220 from tracking optical timing source 209; receiving, by time-frequency offset measurement system 205, incoming optical timing signals 217 from bidirectional terminal 207; producing, by time-frequency offset measurement system 205, time-frequency offset signals 219 from tracking optical timing signal 220 and incoming optical timing signals 217; communicating, by time-frequency offset measurement system 205, time-frequency offset signals 219 to signal processor-controller 204; receiving, by bidirectional terminal 207, clock comb signal 224 from clock frequency comb 203; receiving, by bidirectional terminal 207, synchronization data 270 from optical link 218, synchronization data 270 including incoming optical timing signals 217; communicating, by bidirectional terminal 207, incoming optical timing signals 217 to time-frequency offset measurement system 205 from optical link 218; and communicating, by bidirectional terminal 207, clock comb signal 224 to optical link 218 from clock frequency comb 203 as part of synchronization data 270.

In an embodiment, synchronizing transfer over an optical link further includes receiving, by communicator 215, local one-way data 221 from signal processor-controller 204; communicating, by communicator 215, side information 228 with signal processor-controller 204; and producing, by communicator 215, remote one-way data 222 from local one-way data 221.

Synchronizing transfer over an optical link can include communicating, by communicator 215 via communication channel 214, with second synchronizer 200.2.

Synchronizing transfer over an optical link can include receiving, by two-way processor 241, local one-way data 221 from signal processor-controller 204; receiving, by the two-way processor 241, the remote one-way data 222 from the communicator 215; producing, by the two-way processor 241, two-way output data 223 and clock comb feedback 213 based on the local one-way data 221 and the remote one-way data 222; and communicating, by the two-way processor 241, the clock comb feedback 213 to the clock frequency comb 203.

Synchronizing transfer over an optical link can include receiving, by dispersion compensation unit 256 of second comb timing discriminator 206, incoming clock comb signal 229 from incoming optical timing signals 217 and tracking comb signal 225 from tracking optical timing signal 220; communicating, by dispersion compensation unit 256, incoming clock comb signal 229 and tracking comb signal 225 to signal combiner-splitter 252 of second comb timing discriminator 206; receiving, by signal combiner-splitter 252, incoming clock comb signal 229 and tracking comb signal 225 from dispersion compensation unit 256; producing, by signal combiner-splitter 252, combined coherent optical pulse trains 257 from incoming clock comb signal 229 and tracking comb signal 225; receiving, by leading arm delay stage 254 of second comb timing discriminator 206.2, combined coherent optical pulse trains 257 from signal combiner-splitter 252; producing, by leading arm delay stage 254, leading coherent optical pulse trains 259 from combined coherent optical pulse trains 257; receiving, by lagging arm delay stage 253 of second comb timing discriminator 206.2, combined coherent optical pulse trains 257 from signal combiner-splitter 252; producing, by lagging arm delay stage 253, lagging coherent optical pulse trains 258 from combined coherent optical pulse trains 257; receiving, by leading arm delay stage 254 of second comb timing discriminator 206, the combined coherent optical pulse trains 257 from signal combiner-splitter 252; producing, by leading arm delay stage 254, leading coherent optical pulse trains 259 from combined coherent optical pulse trains 257; receiving, by second signal combiner-splitter 252 of second comb timing discriminator 206, leading coherent optical pulse trains 259 from leading arm delay stage 254; receiving, by second signal combiner-splitter 252, lagging coherent optical pulse trains 258 from lagging arm delay stage 253; producing, by second signal combiner-splitter 252, optical timing signals 260 from leading coherent optical pulse trains 259 and lagging coherent optical pulse trains 258; receiving, by fixed delay stage 255 of second comb timing discriminator 206.2, optical timing signals 260 from signal combiner-splitter 252; producing, by fixed delay stage 255, time offset signal 232 from optical timing signals 260; receiving, by CW heterodyne detector 208, incoming CW optical signal 230 from incoming optical timing signals 217 and CW optical signal 226 from tracking optical timing signal 220; producing, by CW heterodyne detector 208, frequency offset signal 231 from incoming CW optical signal 230 and CW optical signal 226; and combining, by time-frequency offset measurement system 205, time offset signal 232 from second comb timing discriminator 206.2 and frequency offset signal 231 from CW heterodyne detector 208 into time-frequency offset signals 219.

Synchronizing transfer over an optical link can include receiving, by dispersion compensation unit 256 of second comb timing discriminator 206.2, incoming clock comb signal 229 from incoming optical timing signals 217 and tracking comb signal 225 from tracking optical timing signal 220; communicating, by dispersion compensation unit 256 of second comb timing discriminator 206.2, incoming clock comb signal 229 and tracking comb signal 225 to signal combiner-splitter 252 of second comb timing discriminator 206.2; receiving, by signal combiner-splitter 252, incoming clock comb signal 229 and tracking comb signal 225 from dispersion compensation unit 256; producing, by signal combiner-splitter 252, combined coherent optical pulse trains 257 from incoming clock comb signal 229 and tracking comb signal 225; receiving, by high-band BPF 263 of second comb timing discriminator 206.2, combined coherent optical pulse trains 257 from signal combiner-splitter 252; producing, by high-band BPF 263, a high-band optical signal 265 from combined coherent optical pulse trains 257; receiving, by low-band BPF 262 of second comb timing discriminator 206.2, combined coherent optical pulse trains 257 from signal combiner-splitter 252; producing, by low-band BPF 262, low-band optical signal 264 from combined coherent optical pulse trains 257; receiving, by pulse interference detector 266 of second comb timing discriminator 206.2, high-band optical signal 265 from high-band BPF 263; producing, by pulse interference detector 266, high-band interference signal 268 from high-band optical signal 265; receiving, by second pulse interference detector 266.2 of second comb timing discriminator 206.2, low-band optical signal 264 from low-band BPF 262; producing, by second pulse interference detector 266.2, low-band interference signal 267 from low-band optical signal 264; receiving, by phase comparator 269 of second comb timing discriminator 206.2, high-band interference signal 268 from pulse interference detector 266; receiving, by phase comparator 269, low-band interference signal 267 from second pulse interference detector 266.2; producing, by phase comparator 269, time offset signal 232 from high-band interference signal 268 and low-band interference signal 267; receiving, by CW heterodyne detector 208 of time-frequency offset measurement system 205, incoming CW optical signal 230 from incoming optical timing signals 217 and CW optical signal 226 from tracking optical timing signal 220; producing, by CW heterodyne detector 208, frequency offset signal 231 from incoming CW optical signal 230 and CW optical signal 226; and combining, by time-frequency offset measurement system 205, time offset signal 232 from second comb timing discriminator 206.2 and frequency offset signal 231 from CW heterodyne detector 208 into time-frequency offset signals 219.

Synchronizing transfer over an optical link can include receiving, by dispersion compensation unit 256 of second comb timing discriminator 206.2, incoming clock comb signal 229 from incoming optical timing signals 217 and tracking comb signal 225 from tracking optical timing signal 220; communicating, by dispersion compensation unit 256, incoming clock comb signal 229 and tracking comb signal 225 to signal combiner-splitter 252 dispersion compensation unit 256 of second comb timing discriminator 206.2; receiving, by signal combiner-splitter 252, incoming clock comb signal 229 and tracking comb signal 225 from dispersion compensation unit 256; producing, by signal combiner-splitter 252, combined coherent optical pulse trains 257 from the incoming clock comb signal 229 and tracking comb signal 225; receiving, by high-band BPF 263 of second comb timing discriminator 206.2, combined coherent optical pulse trains 257 from signal combiner-splitter 252; producing, by high-band BPF 263, time offset signal 232 from combined coherent optical pulse trains 257; receiving, by CW heterodyne detector 208 of time-frequency offset measurement system 205, incoming CW optical signal 230 from incoming optical timing signals 217 and CW optical signal 226 from tracking optical timing signal 220; producing, by CW heterodyne detector 208, frequency offset signal 231 from incoming CW optical signal 230 and CW optical signal 226; and combining, by time-frequency offset measurement system 205, time offset signal 232 from second comb timing discriminator 206.2 and frequency offset signal 231 from CW heterodyne detector 208 into time-frequency offset signals 219.

Synchronizing transfer over an optical link can include receiving, by comb digital controller 234 of tracking frequency comb 202, tracking comb feedback 211; receiving, by comb digital controller 234, phase-lock detection signals 237 from phase-lock detection signals 237; producing, by comb digital controller 234, actuator control signals 235 from tracking comb feedback 211 and phase-lock detection signals 237; receiving, by frequency comb optics package 233 of tracking frequency comb 202, the actuator control signals 235 from comb digital controller 234; producing, by frequency comb optics package 233, tracking comb signal 225 from actuator control signals 235; receiving, by phase-lock detection unit 236 of tracking frequency comb 202, tracking comb signal 225 from frequency comb optics package 233; receiving, by phase-lock detection unit 236, frequency reference signal 227; and producing, by phase-lock detection unit 236, phase-lock detection signals 237 from tracking comb signal 225 and frequency reference signal 227.

Synchronizing transfer over an optical link can include receiving, by comb digital controller 234 of clock frequency comb 203, clock comb feedback 213 from two-way processor 241; receiving, by comb digital controller 234, phase-lock detection signals 237 from phase-lock detection unit 236 of clock frequency comb 203; producing, by comb digital controller 234, actuator control signals 235 from clock comb feedback 213 and phase-lock detection signals 237; receiving, by frequency comb optics package 233 of clock frequency comb 203, actuator control signals 235 from comb digital controller 234; producing, by frequency comb optics package 233, clock comb signal 224 from actuator control signals 235; receiving, by phase-lock detection unit 236, clock comb signal 224 from frequency comb optics package 233; receiving, by phase-lock detection unit 236, frequency reference signal 227 from frequency reference oscillator 201; producing, by phase-lock detection unit 236, phase-lock detection signals 237 from clock comb signal 224 and frequency reference signal 227; and communicating clock comb signal 224 from frequency comb optics package 233 to bidirectional terminal 207.

Synchronizing transfer over an optical link can include receiving, by phase-frequency agile synthesizer 239 of comb digital controller 234, tracking comb feedback 211 or clock comb feedback 213; producing, by phase-frequency agile synthesizer 239, synthesizer data 271 from tracking comb feedback 211; receiving, by signal conditioning 238 of comb digital controller 234, phase-lock detection signals 237; conditioning, by signal conditioning 238, phase-lock detection signals 237 to produce conditioned phase-lock detection signals 272; communicating, by signal conditioning 238, conditioned phase-lock detection signals 272 to phase comparator 269 of comb digital controller 234; receiving, by phase comparator 269, synthesizer data 271 from phase-frequency agile synthesizer 239 and conditioned phase-lock detection signals 272 from signal conditioning 238; comparing, by phase comparator 269, synthesizer data 271 to conditioned phase-lock detection signals 272; producing, by phase comparator 269, comparator data 273 from comparing synthesizer data 271 to conditioned phase-lock detection signals 272; communicating comparator data 273 to loop filter 240 of comb digital controller 234 from phase comparator 269; receiving, by loop filter 240, comparator data 273 from phase comparator 269; producing, by loop filter 240, actuator control signals 235 from comparator data 273; and communicating actuator control signals 235 from loop filter 240 to frequency comb optics package 233.

Figure 12:
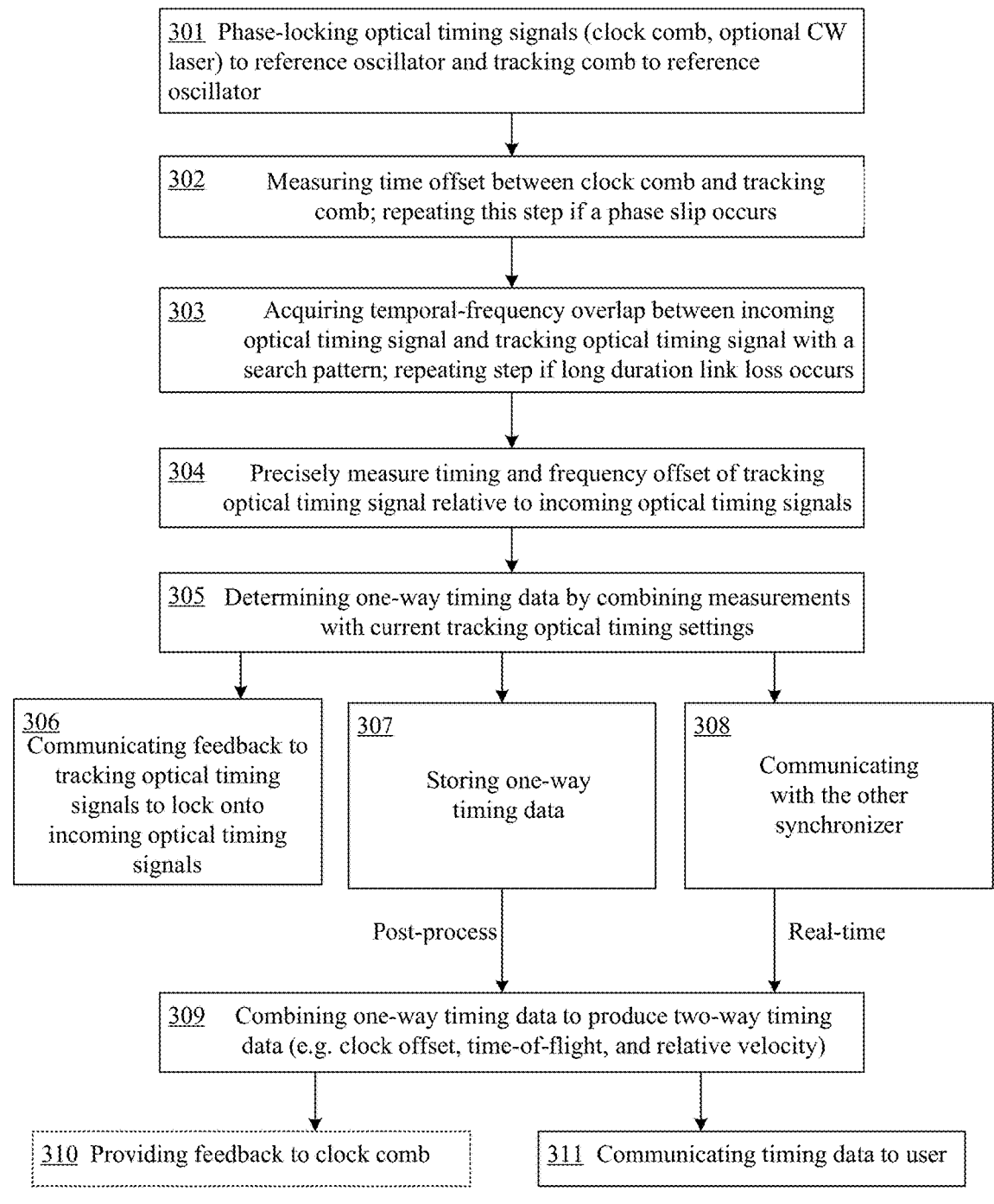
FIG. 12 shows steps in a process for synchronizing transfer over an optical link.

In an embodiment, with reference to FIG. 12, a process for synchronizing transfer over an optical link (300) provides frequency comparison, time comparison, frequency synchronization, or full time synchronization. For frequency comparison, the process can include: phase-locking optical timing signals and clock frequency comb to reference oscillator (step 301); acquiring temporal-frequency overlap between incoming optical timing signal and tracking optical timing signal with a search pattern; repeating step if long duration link loss occurs (step 303); precisely measure timing and frequency offset of tracking optical timing signal relative to incoming optical timing signals (step 304); determining one-way timing data by combining the timing and frequency offset measurements with current tracking optical timing settings (step 305); communicating feedback to tracking optical timing signals to lock onto incoming optical timing signals (step 306); storing one-way timing data (step 307); later or in real time through a communication channel, combining one-way timing data to produce two-way timing data (e.g. clock offset, time-of-flight, and relative velocity) including the relative frequency between the sites (step 309).

In an embodiment, with reference to FIG. 12, a process for synchronizing transfer over an optical link (300) to accomplish time comparison additionally includes at least the following steps: phase-locking optical timing signals and clock frequency comb to reference oscillator (step 301); calibrating all time delays in the synchronizer; measuring time offset between clock comb and tracking comb; repeating this step if a phase slip occurs (step 302); acquiring temporal-frequency overlap between incoming optical timing signal and tracking optical timing signal with a search pattern; repeating step if long duration link loss occurs (step 303); precisely measure timing and frequency offset of tracking optical timing signal relative to incoming optical timing signals (step 304); determining one-way timing data by combining measurements with current tracking optical timing settings (step 305); possibly communicating with the other synchronizer (step 308); in real-time or later combining one-way timing data to produce two-way timing data (e.g. clock offset, time-of-flight, and relative velocity) including the time offset (step 309).

In an embodiment, with reference to FIG. 12, a process for synchronizing transfer over an optical link (300) for frequency synchronization includes: phase-locking optical timing signals and clock frequency comb to reference oscillator (step 301); acquiring temporal-frequency overlap between incoming optical timing signal and tracking optical timing signal with a search pattern; repeating step if long duration link loss occurs (step 303); precisely measure timing and frequency offset of tracking optical timing signal relative to incoming optical timing signals (step 304); determining one-way timing data by combining measurements with current tracking optical timing settings (step 305); communicating feedback to tracking optical timing signals to lock onto incoming optical timing signals (step 306); storing one-way timing data (step 307); communicating with the other synchronizer (step 308); combining one-way timing data to produce two-way timing data (e.g. clock offset, time-of-flight, and relative velocity) particularly including any frequency offset (step 309); providing feedback to clock comb (step 310); and communicating timing data to user (step 311).

In an embodiment, with reference to FIG. 12, a process for synchronizing transfer over an optical link (300) for full time synchronization includes: phase-locking optical timing signals and clock frequency comb to reference oscillator (step 301); calibrating all time delays in the synchronizer; measuring time offset between clock comb and tracking comb; repeating this step if a phase slip occurs (step 302); acquiring temporal-frequency overlap between incoming optical timing signal and tracking optical timing signal with a search pattern; repeating step if long duration link loss occurs (step 303); precisely measure timing and frequency offset of tracking optical timing signal relative to incoming optical timing signals (step 304); determining one-way timing data by combining measurements with current tracking optical timing settings (step 305); communicating feedback to tracking optical timing signals to lock onto incoming optical timing signals (step 306); storing one-way timing data (step 307); communicating with the other synchronizer (step 308); combining one-way timing data to produce two-way timing data (e.g. clock offset, time-of-flight, and relative velocity) (step 309); providing feedback to clock comb (step 310); and communicating timing data to user (step 311).

Modified steps can be performed in synchronizing transfer over an optical link comb timing discriminator 206 with synchronizer 200 for a paper clock. In an embodiment, the clock frequency comb 203 is not included within the synchronizer but is replaced by a paper clock that includes tracking comb signal 225 that is an optical pulse train output from tracking frequency comb 202, and that is filtered to match a bandwidth of clock comb signal 224. Tracking comb signal 225 can include a parallel data stream output that contains timing corrections that can be applied to the optical pulse train from tracking frequency comb 202 to achieve frequency comparison, frequency syntonization, or time synchronization as described in the previous paragraphs.

Figure 13:
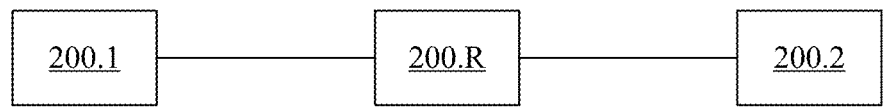
FIG. 13 shows a configuration for a coherent repeater operation.

Modified steps can be performed in synchronizing transfer over an optical link comb timing discriminator 206 with synchronizer 200 for a repeater configuration, e.g., as shown in FIG. 13. In an embodiment, a coherent repeater unit 200.R, includes two synchronizers 200 that share a common signal processor unit, but with separate tracking frequency combs 202 that both exclude clock frequency comb 203. The relative timing from the two tracking frequency combs is recorded by the signal processer and transmitted over the communication link to the two remote synchronizers 200.1 and 200.2. This information generates timing information to achieve frequency comparison, frequency syntonization, or time synchronization between synchronizer 200.1 and synchronizer 200.2.

It should be appreciated that synchronizer 200 and synchronizing transfer over an optical link can be used for a network of optical or rf clocks that are synchronized for use in navigation or coherent sensing. It should be appreciated that synchronizer 200 and synchronizing transfer over an optical link also provides the time-of-flight and range information between sites with high precision so that it can support multi-vehicle formation flying for generation of coherent synthetized apertures for active or passive detection. The system has the benefit that it provides timing, frequency, and range information simultaneously between defined reference planes at both sites. This information is available at 1000 times higher precision and accuracy than with conventional microwave-based methods. The timing precision is less than one femtosecond. The ranging precision is less than a micron, and the frequency precision is less than one part in $10^{19}$ in fractional units, wherein all these precisions include any systematic uncertainties. Unlike conventional optical time transfer approaches, this method achieves this level of precision without a power penalty, i.e., at the shot noise limit. Furthermore, as the system can use the same fiber optic technology as that used by the optical communication industry, it is compatible with future optical free-space communication links and can be implemented in a low size-weight and power package suitable for operation outside of the laboratory, on airborne platforms, or on spaceborne platforms.

Synchronizer 200 and processes disclosed herein have numerous beneficial uses, including establishing free-space optical clock networks that can distribute time and frequency either regionally or globally. Because the system can operate at the shot-noise limit without excess power penalty, this network can extend across long distances at low transmit power and low transmit aperture size, while simultaneously providing 1000 times greater higher performance than conventional microwave-based time-frequency transfer and provides long distance optical clock networks. If the optical clock network uses high performance optical clocks at each node of the network, it supports fundamental scientific experiments in relativity, in geodesy, or in investigation of violation of current understanding of the physical world. Alternatively, the clock network could have a single main optical clock, and the synchronizer could synchronize multiple secondary optical clocks. In this configuration, the optical clock network could be used for time-frequency distribution and to support precision navigation. The synchronizer could also be used to establish distributed timing across a network for coherent sensing, either passive or active, in either the optical or radiofrequency domain. For this coherent sensing application, the synchronizer additionally provides precise ranging information between sites and including orientation. The synchronizer could compare the time between two distant optical clocks for geodetic applications with accuracy at the sub-millimeter level after incorporating atmospheric corrections. Advantageously, for these applications, the synchronizer 200 overcomes limitations and technical deficiencies of conventional devices that use radiofrequency or microwave signals. These conventional microwave-based approaches only provide timing precision at the picosecond level because of systematic errors and only achieve ranging precision at the cm level. Similarly, conventional optically-based approaches in which an radiofrequency or microwave modulation is applied to an optical carrier, as for example in optical communication, also only provide timing precision at the picosecond level because of systematic errors, and only achieve ranging precision at the cm level. Synchronizer 200 overcomes these limitations by a factor of 1000 because it maintains the timing in the optical domain. Other optical timing approaches that exploit linear optical sampling have been demonstrated over kilometer distances. Compared to these approaches, the synchronizer can operate at 1000 times lower received power without any penalty in performance because the synchronizer does not suffer from the power penalty associated with linear optical sampling. This reduction in received power has significant advantages since it can translate to much longer distance operation, for example from the ground to a satellite. Alternatively, the lower received power can allow the use of 1000 times lower transmit power for the same range of operation, dramatically reducing the physical size and electrical power consumption required for the time-frequency transfer. This reduction in the required received power is accomplished by use of the tracking comb, which is unique to this implementation of optical time transfer.

Synchronizer 200 and processes herein unexpectedly the ability to operate at the standard quantum limit for timing distribution. By use of the combination of the tracking comb and coherent integration over the coherence time of the atmosphere, the synchronizer can successfully operate at less than one photon per optical pulse from the comb. Synchronizer 200 was operated at a fractional occupation number as low as $\frac{1}{25}^{th}$. The system can operate even if most (24 out of 25) comb pulses do not contain a photon. This is possible through the use of the tracking comb and coherent integration over the coherence time of the atmosphere. As a result, this power threshold for operation is over 1000 times lower than the power threshold for previous optical time transfer approaches. Unexpectedly, operation at this low power does not cause additional performance degradation, and the synchronizer can still provide timing comparison or synchronization at the femtosecond level, frequency comparison or syntonization at fractional levels of one part in $10^{19}$, and ranging information at the micron-level. The synchronizer provides the unexpected ability to establish satellite-based optical time transfer for global time distribution, large scale optical clock networks for ultra-precise navigation and timing as well as scientific experiments, and coherent sensing through distributed arrays at high microwave frequencies or optical frequencies. The low power threshold and correspondingly extended range provide the novel capability of a compact synchronizer compatible with the constraints of airborne or spaceborne instruments, not provided by conventional devices or conventional processes. Moreover, by inclusion of optical atmospheric spectroscopy on the same timing signals, the system provides the unexpected capability of atmosphere-corrected geodetic ranging at the sub-millimeter level.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A synchronizer for synchronizing transfer over an optical link, the synchronizer comprising:
   a frequency reference oscillator that produces a frequency reference signal;
   a tracking optical timing source in communication with the frequency reference oscillator and comprises a tracking frequency comb and that:
      receives, by the tracking frequency comb, the frequency reference signal from the frequency reference oscillator;
      produces, by the tracking frequency comb, a tracking comb signal;
      receives, tracking comb feedback from a signal processor-controller;
      produces a tracking optical timing signal based on the tracking comb feedback;
   a comb timing discriminator in communication with the tracking optical timing source and a clock frequency comb and that:
      receives the tracking comb signal from the tracking optical timing source;
      receives a clock comb signal from the clock frequency comb; and
      produces an clock comb-tracking comb time offset from the clock comb signal and the tracking comb signal;
   the clock frequency comb in communication with the clock frequency comb, the frequency reference oscillator, and a bidirectional terminal and that:
      receives the frequency reference signal from the frequency reference oscillator;
      produces the clock comb signal based on the frequency reference signal;
      produces a clock output based on the frequency reference signal; and
      communicates the clock comb signal to the comb timing discriminator and a bidirectional terminal;
   the signal processor-controller in communication with the tracking optical timing source, a time-frequency offset measurement system, and the comb timing discriminator and that:
      receives the clock comb-tracking comb time offset from the comb timing discriminator;
      receives a time-frequency offset signals from the time-frequency offset measurement system;
      produces, based on the clock comb-tracking comb time offset and the time-frequency offset signals, the tracking comb feedback and local one-way data;
   the time-frequency offset measurement system in communication with the tracking optical timing source, the bidirectional terminal, and the signal processor-controller; comprises a second comb timing discriminator; and that:
      receives the tracking optical timing signal from the tracking optical timing source;
      receives an incoming optical timing signals from the bidirectional terminal;
      produces the time-frequency offset signals from the tracking optical timing signal and the incoming optical timing signals; and
      communicates the time-frequency offset signals to the signal processor-controller; and
   the bidirectional terminal in communication with the clock frequency comb and the time-frequency offset measurement system and that:
      receives the clock comb signal from the clock frequency comb;
      receives synchronization data from an optical link, the synchronization data comprising incoming optical timing signals;
      communicates the incoming optical timing signals to time-frequency offset measurement system from the optical link; and
      communicates the clock comb signal to the optical link from the clock frequency comb as part of the synchronization data.

2. The synchronizer of claim 1, further comprising:
   a communicator in communication with the signal processor-controller and that:
      receives the local one-way data from the signal processor-controller;
      communicates side information with signal processor-controller; and
      produces remote one-way data from the local one-way data.

3. The synchronizer of claim 2, wherein the communicator further communicates via a communication channel with a second synchronizer.

4. The synchronizer of claim 2, further comprising:
   a two-way processor in communication with the clock frequency comb, the signal processor-controller, and the communicator and that:
      receives local one-way data from the signal processor-controller;
      receives the remote one-way data from the communicator;

produces two-way output data and clock comb feedback based on the local one-way data and the remote one-way data; and communicates the clock comb feedback to the clock frequency comb.

5. The synchronizer of claim 1, wherein the time-frequency offset measurement system further comprises a CW heterodyne detector, such that:

the second comb timing discriminator comprises:
a dispersion compensation unit that:
receives an incoming clock comb signal from the incoming optical timing signals and tracking comb signal from the tracking optical timing signal; and
communicates the incoming clock comb signal and the tracking comb signal to a signal combiner-splitter;
the signal combiner-splitter in communication with the dispersion compensation unit and that receives the incoming clock comb signal and the tracking comb signal from the dispersion compensation unit, and produces a combined coherent optical pulse trains from the incoming clock comb signal and the tracking comb signal;
a leading arm delay stage in communication with the signal combiner-splitter and that receives the combined coherent optical pulse trains from the signal combiner-splitter and produces a leading coherent optical pulse trains from the combined coherent optical pulse trains;
a lagging arm delay stage in communication with the signal combiner-splitter and that receives the combined coherent optical pulse trains from the signal combiner-splitter and produces a lagging coherent optical pulse trains from the combined coherent optical pulse trains;
a leading arm delay stage in communication with the signal combiner-splitter and that receives the combined coherent optical pulse trains from the signal combiner-splitter and produces a leading coherent optical pulse trains from the combined coherent optical pulse trains;
a second signal combiner-splitter in communication with the leading arm delay stage and that receives the leading coherent optical pulse trains from the leading arm delay stage, receives the lagging coherent optical pulse trains from the lagging arm delay stage, and produces an optical timing signals from the leading coherent optical pulse trains and the lagging coherent optical pulse trains;
a fixed delay stage in communication with the signal combiner-splitter and that receives the optical timing signals from the signal combiner-splitter and produces a time offset signal from the optical timing signals; and
the CW heterodyne detector that receives an incoming CW optical signal from the incoming optical timing signals and CW optical signal from the tracking optical timing signal and produces a frequency offset signal from the incoming CW optical signal and the CW optical signal,
wherein the time-frequency offset measurement system combines the time offset signal from the second comb timing discriminator and the frequency offset signal from the CW heterodyne detector into the time-frequency offset signals.

6. The synchronizer of claim 1, wherein the time-frequency offset measurement system further comprises a CW heterodyne detector, such that:

the second comb timing discriminator comprises:
a dispersion compensation unit that:
receives an incoming clock comb signal from the incoming optical timing signals and tracking comb signal from the tracking optical timing signal; and
communicates the incoming clock comb signal and the tracking comb signal to a signal combiner-splitter;
the signal combiner-splitter in communication with the dispersion compensation unit and that receives the incoming clock comb signal and the tracking comb signal from the dispersion compensation unit, and produces a combined coherent optical pulse trains from the incoming clock comb signal and the tracking comb signal;
a high-band BPF in communication with the signal combiner-splitter and that receives the combined coherent optical pulse trains from the signal combiner-splitter and produces a high-band optical signal from the combined coherent optical pulse trains;
a low-band BPF in communication with the signal combiner-splitter and that receives the combined coherent optical pulse trains from the signal combiner-splitter and produces a low-band optical signal from the combined coherent optical pulse trains;
a pulse interference detector in communication with the high-band BPF and that receives the high-band optical signal from the high-band BPF and produces a high-band interference signal from the high-band optical signal;
a second pulse interference detector in communication with the low-band BPF and that receives the low-band optical signal from the low-band BPF, and produces a low-band interference signal from the low-band optical signal;
a phase comparator in communication with the pulse interference detector and the second pulse interference detector and that receives the high-band interference signal from the pulse interference detector, receives the low-band interference signal from the second pulse interference detector, and produces a time offset signal from the high-band interference signal and the low-band interference signal; and
the CW heterodyne detector receives an incoming CW optical signal from the incoming optical timing signals and CW optical signal from the tracking optical timing signal and produces a frequency offset signal from the incoming CW optical signal and the CW optical signal,
wherein the time-frequency offset measurement system combines the time offset signal from the second comb timing discriminator and the frequency offset signal from the CW heterodyne detector into the time-frequency offset signals.

7. The synchronizer of claim 1, wherein the time-frequency offset measurement system further comprises a CW heterodyne detector, such that:

the second comb timing discriminator comprises:
a dispersion compensation unit that:
receives an incoming clock comb signal from the incoming optical timing signals and tracking comb signal from the tracking optical timing signal; and communicates the incoming clock comb signal and the tracking comb signal to a signal combiner-splitter;

the signal combiner-splitter in communication with the dispersion compensation unit and that receives the incoming clock comb signal and the tracking comb signal from the dispersion compensation unit, and produces a combined coherent optical pulse trains from the incoming clock comb signal and the tracking comb signal; and a photodetector unit in communication with the signal combiner-splitter and that receives the combined coherent optical pulse trains from the signal combiner-splitter and produces a time offset signal from the combined coherent optical pulse trains; and the CW heterodyne detector receives an incoming CW optical signal from the incoming optical timing signals and CW optical signal from the tracking optical timing signal and produces a frequency offset signal from the incoming CW optical signal and the CW optical signal, wherein the time-frequency offset measurement system combines the time offset signal from the second comb timing discriminator and the frequency offset signal from the CW heterodyne detector into the time-frequency offset signals.

8. The synchronizer of claim 1, wherein the tracking frequency comb comprises:

a comb digital controller in communication with a phase-lock detection unit and that receives the tracking comb feedback, receives a phase-lock detection signals from the phase-lock detection signals, and produces a actuator control signals from the tracking comb feedback and the phase-lock detection signals;

a frequency comb optics package in communication with the comb digital controller and that receives the actuator control signals from the comb digital controller and produces the tracking comb signal from the actuator control signals; and the phase-lock detection unit in communication with the frequency comb optics package and the comb digital controller and that receives the tracking comb signal from the frequency comb optics package, receives the frequency reference signal, and produces the phase-lock detection signals from the tracking comb signal and the frequency reference signal.

9. The synchronizer of claim 1, wherein the clock frequency comb comprises:

a comb digital controller in communication with the frequency reference oscillator, a phase-lock detection unit, and a frequency comb optics package and that optionally receives a clock comb feedback from a two-way processor, receives a phase-lock detection signals from the phase-lock detection unit, and produces an actuator control signals from the clock comb feedback and the phase-lock detection signals;

the frequency comb optics package in communication with the comb digital controller and that receives the actuator control signals from the comb digital controller and produces the clock comb signal from the actuator control signals; and the phase-lock detection unit in communication with the frequency comb optics package and the comb digital controller and that receives the clock comb signal from the frequency comb optics package, receives the frequency reference signal from the frequency reference oscillator, and produces the phase-lock detection signals from the clock comb signal and the frequency reference signal.

10. The synchronizer of claim 1, wherein the comb digital controller comprises:

a phase-frequency agile synthesizer that receives the tracking comb feedback or clock comb feedback and produces synthesizer data from the tracking comb feedback;

a signal conditioning that receives the phase-lock detection signals, conditions the phase-lock detection signals to produce conditioned phase-lock detection signals, and communicates the conditioned phase-lock detection signals to a phase comparator;

the phase comparator in communication with the phase-frequency agile synthesizer and the signal conditioning and that receives the synthesizer data from the phase-frequency agile synthesizer and conditioned phase-lock detection signals from the signal conditioning, compares the synthesizer data to the conditioned phase-lock detection signals to produce comparator data, and communicates the comparator data to a loop filter; and the loop filter in communication with the phase comparator and that receives the comparator data from the phase comparator and produces the actuator control signals from the comparator data.

11. A process for synchronizing transfer over an optical link with the synchronizer, the process comprising:

producing, by the frequency reference oscillator, the frequency reference signal;

receiving, by the tracking frequency comb, the frequency reference signal from the frequency reference oscillator;

producing, by the tracking frequency comb, a tracking comb signal;

receiving, by the tracking optical timing source, the tracking comb feedback from the signal processor-controller;

producing, by the tracking optical timing source, the tracking optical timing signal based on the tracking comb feedback;

receiving, by the comb timing discriminator, the tracking comb signal from the tracking optical timing source;

receiving by the comb timing discriminator, the clock comb signal from the clock frequency comb;

producing, by the comb timing discriminator, the clock comb-tracking comb time offset from the clock comb signal and the tracking comb signal;

receiving, by the clock frequency comb, the frequency reference signal from the frequency reference oscillator;

producing, by the clock frequency comb, the clock comb signal based on the frequency reference signal;

producing, by the clock frequency comb, the clock output based on the frequency reference signal;

communicating, by the clock frequency comb, the clock comb signal to the comb timing discriminator and the bidirectional terminal;

receiving, by the signal processor-controller, the clock comb-tracking comb time offset from the comb timing discriminator;

receiving, by the signal processor-controller, the time-frequency offset signals from the time-frequency offset measurement system;

producing, by the signal processor-controller based on the clock comb-tracking comb time offset and the time-frequency offset signals, the tracking comb feedback and local one-way data;
receiving, by the time-frequency offset measurement system, the tracking optical timing signal from the tracking optical timing source;
receiving, by the time-frequency offset measurement system, the incoming optical timing signals from the bidirectional terminal;
producing, by the time-frequency offset measurement system, the time-frequency offset signals from the tracking optical timing signal and the incoming optical timing signals;
communicating, by the time-frequency offset measurement system, the time-frequency offset signals to the signal processor-controller;
receiving, by the bidirectional terminal, the clock comb signal from the clock frequency comb;
receiving, by the bidirectional terminal, synchronization data from the optical link, the synchronization data comprising incoming optical timing signals;
communicating, by the bidirectional terminal, the incoming optical timing signals to time-frequency offset measurement system from the optical link; and
communicating, by the bidirectional terminal, the clock comb signal to the optical link from the clock frequency comb as part of the synchronization data.

12. The process of claim 11, further comprising:
receiving, by the communicator, the local one-way data from the signal processor-controller;
communicating, by the communicator, the side information with signal processor-controller; and
producing, by the communicator, remote one-way data from the local one-way data.

13. The process of claim 12, further comprising communicating, by the communicator via a communication channel, with a second synchronizer.

14. The process of claim 12, further comprising:
receiving, by a two-way processor, local one-way data from the signal processor-controller;
receiving, by the two-way processor, the remote one-way data from the communicator;
producing, by the two-way processor, two-way output data and clock comb feedback based on the local one-way data and the remote one-way data; and
communicating, by the two-way processor, the clock comb feedback to the clock frequency comb.

15. The process of claim 12, further comprising:
receiving, by a dispersion compensation unit of the second comb timing discriminator, an incoming clock comb signal from the incoming optical timing signals and tracking comb signal from the tracking optical timing signal;
communicating, by the dispersion compensation unit, the incoming clock comb signal and the tracking comb signal to a signal combiner-splitter of the second comb timing discriminator;
receiving, by the signal combiner-splitter, the incoming clock comb signal and the tracking comb signal from the dispersion compensation unit;
producing, by the signal combiner-splitter, a combined coherent optical pulse trains from the incoming clock comb signal and the tracking comb signal;
receiving, by a leading arm delay stage of the second comb timing discriminator, the combined coherent optical pulse trains from the signal combiner-splitter;
producing, by the leading arm delay stage, a leading coherent optical pulse trains from the combined coherent optical pulse trains;
receiving, by a lagging arm delay stage of the second comb timing discriminator, the combined coherent optical pulse trains from the signal combiner-splitter;
producing, by the lagging arm delay stage, a lagging coherent optical pulse trains from the combined coherent optical pulse trains;
receiving, by a leading arm delay stage of the second comb timing discriminator, the combined coherent optical pulse trains from the signal combiner-splitter;
producing, by the leading arm delay stage, a leading coherent optical pulse trains from the combined coherent optical pulse trains;
receiving, by a second signal combiner-splitter of the second comb timing discriminator, the leading coherent optical pulse trains from the leading arm delay stage;
receiving, by the second signal combiner-splitter, the lagging coherent optical pulse trains from the lagging arm delay stage;
producing, by the second signal combiner-splitter, an optical timing signals from the leading coherent optical pulse trains and the lagging coherent optical pulse trains;
receiving, by a fixed delay stage of the second comb timing discriminator, the optical timing signals from the signal combiner-splitter;
producing, by the fixed delay stage, a time offset signal from the optical timing signals;
receiving, by a CW heterodyne detector, an incoming CW optical signal from the incoming optical timing signals and CW optical signal from the tracking optical timing signal;
producing, by the CW heterodyne detector, a frequency offset signal from the incoming CW optical signal and the CW optical signal; and
combining, by the time-frequency offset measurement system, the time offset signal from the second comb timing discriminator and the frequency offset signal from the CW heterodyne detector into the time-frequency offset signals.

16. The process of claim 11, further comprising:
receiving, by a dispersion compensation unit of the second comb timing discriminator, an incoming clock comb signal from the incoming optical timing signals and tracking comb signal from the tracking optical timing signal;
communicating, by the dispersion compensation unit of the second comb timing discriminator, the incoming clock comb signal and the tracking comb signal to a signal combiner-splitter of the second comb timing discriminator;
receiving, by the signal combiner-splitter, the incoming clock comb signal and the tracking comb signal from the dispersion compensation unit;
producing, by the signal combiner-splitter, a combined coherent optical pulse trains from the incoming clock comb signal and the tracking comb signal;
receiving, by a high-band BPF of the second comb timing discriminator, the combined coherent optical pulse trains from the signal combiner-splitter;
producing, by the high-band BPF, a high-band optical signal from the combined coherent optical pulse trains;
receiving, by a low-band BPF of the second comb timing discriminator, the combined coherent optical pulse trains from the signal combiner-splitter;

producing, by the low-band BPF, a low-band optical signal from the combined coherent optical pulse trains;
receiving, by a pulse interference detector of the second comb timing discriminator, the high-band optical signal from the high-band BPF;
producing, by the pulse interference detector, a high-band interference signal from the high-band optical signal;
receiving, by a second pulse interference detector of the second comb timing discriminator, the low-band optical signal from the low-band BPF;
producing, by the second pulse interference detector, a low-band interference signal from the low-band optical signal;
receiving, by a phase comparator of the second comb timing discriminator, the high-band interference signal from the pulse interference detector;
receiving, by the phase comparator, the low-band interference signal from the second pulse interference detector;
producing, by the phase comparator, a time offset signal from the high-band interference signal and the low-band interference signal;
receiving, by a CW heterodyne detector of the time-frequency offset measurement system, an incoming CW optical signal from the incoming optical timing signals and CW optical signal from the tracking optical timing signal;
producing, by the CW heterodyne detector, a frequency offset signal from the incoming CW optical signal and the CW optical signal; and
combining, by the time-frequency offset measurement system, the time offset signal from the second comb timing discriminator and the frequency offset signal from the CW heterodyne detector into the time-frequency offset signals.

17. The process of claim 11, further comprising:
receiving, by a dispersion compensation unit of the second comb timing discriminator, an incoming clock comb signal from the incoming optical timing signals and tracking comb signal from the tracking optical timing signal; and
communicating, by the dispersion compensation unit, the incoming clock comb signal and the tracking comb signal to a signal combiner-splitter dispersion compensation unit of the second comb timing discriminator;
receiving, by the signal combiner-splitter, the incoming clock comb signal and the tracking comb signal from the dispersion compensation unit;
producing, by the signal combiner-splitter, a combined coherent optical pulse trains from the incoming clock comb signal and the tracking comb signal;
receiving, by a high-band BPF of the second comb timing discriminator, the combined coherent optical pulse trains from the signal combiner-splitter;
producing, by the high-band BPF, a time offset signal from the combined coherent optical pulse trains;
receiving, by a CW heterodyne detector of the time-frequency offset measurement system, an incoming CW optical signal from the incoming optical timing signals and CW optical signal from the tracking optical timing signal;
producing, by the CW heterodyne detector, a frequency offset signal from the incoming CW optical signal and the CW optical signal; and
combining, by the time-frequency offset measurement system, the time offset signal from the second comb timing discriminator and the frequency offset signal from the CW heterodyne detector into the time-frequency offset signals.

18. The process of claim 11, further comprising:
receiving, by a comb digital controller of the tracking frequency comb, the tracking comb feedback;
receiving, by the comb digital controller, a phase-lock detection signals from the phase-lock detection signals;
producing, by the comb digital controller, a actuator control signals from the tracking comb feedback and the phase-lock detection signals;
receiving, by a frequency comb optics package of the tracking frequency comb, the actuator control signals from the comb digital controller;
producing, by the frequency comb optics package, the tracking comb signal from the actuator control signals;
receiving, by a phase-lock detection unit of the tracking frequency comb, the tracking comb signal from the frequency comb optics package;
receiving, by the phase-lock detection unit, the frequency reference signal; and
producing, by the phase-lock detection unit, the phase-lock detection signals from the tracking comb signal and the frequency reference signal.

19. The process of claim 11, wherein the clock frequency comb comprises:
receiving, by a comb digital controller of the clock frequency comb, a clock comb feedback from a two-way processor;
receiving, by the comb digital controller, a phase-lock detection signals from a phase-lock detection unit of the clock frequency comb;
producing, by the comb digital controller, an actuator control signals from the clock comb feedback and the phase-lock detection signals;
receiving, by a frequency comb optics package of the clock frequency comb, the actuator control signals from the comb digital controller;
producing, by the frequency comb optics package, the clock comb signal from the actuator control signals;
receiving, by the phase-lock detection unit, the clock comb signal from the frequency comb optics package;
receiving, by the phase-lock detection unit, the frequency reference signal from the frequency reference oscillator;
producing, by the phase-lock detection unit, the phase-lock detection signals from the clock comb signal and the frequency reference signal; and
communicating the clock comb signal from the frequency comb optics package to the bidirectional terminal.

20. The process of claim 11, further comprising:
receiving, by a phase-frequency agile synthesizer of the comb digital controller, the tracking comb feedback or clock comb feedback;
producing, by the phase-frequency agile synthesizer, synthesizer data from the tracking comb feedback;
receiving, by a signal conditioning of the comb digital controller, the phase-lock detection signals;
conditioning, by the signal conditioning, the phase-lock detection signals to produce conditioned phase-lock detection signals;
communicating, by the signal conditioning, the conditioned phase-lock detection signals to a phase comparator of the comb digital controller;

receiving, by the phase comparator, the synthesizer data from the phase-frequency agile synthesizer and the conditioned phase-lock detection signals from the signal conditioning;

comparing, by the phase comparator, the synthesizer data to the conditioned phase-lock detection signals;

producing, by the phase comparator, comparator data from comparing the synthesizer data to the conditioned phase-lock detection signals;

communicating the comparator data to a loop filter of the comb digital controller from the phase comparator; and receiving, by the loop filter, the comparator data from the phase comparator;

producing, by the loop filter, the actuator control signals from the comparator data; and communicating the actuator control signals from the loop filter to the frequency comb optics package.

\* \* \* \* \*